(12) United States Patent
Wu et al.

(10) Patent No.: US 7,028,147 B2
(45) Date of Patent: Apr. 11, 2006

(54) SYSTEM AND METHOD FOR EFFICIENTLY AND RELIABLY PERFORMING WRITE CACHE MIRRORING

(75) Inventors: Chia Y. Wu, Newark, CA (US); John D. Acton, Danville, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 466 days.

(21) Appl. No.: 10/319,351

(22) Filed: Dec. 13, 2002

(65) Prior Publication Data
US 2004/0117580 A1    Jun. 17, 2004

(51) Int. Cl.
*G06F 12/00* (2006.01)

(52) U.S. Cl. ............... 711/150; 711/151; 711/152; 711/163

(58) Field of Classification Search ......... 711/113, 711/170, 2, 142, 143, 141, 202, 150, 151, 711/163; 710/310, 123
See application file for complete search history.

(56) References Cited

U.S. PATENT DOCUMENTS

| | | | |
|---|---|---|---|
| 4,991,079 A | 2/1991 | Dann | 709/201 |
| 5,072,373 A | 12/1991 | Dann | 709/201 |
| 5,146,607 A | 9/1992 | Sood et al. | 711/211 |
| 5,255,369 A | 10/1993 | Dann | 709/214 |
| 5,440,752 A * | 8/1995 | Lentz et al. | 710/123 |
| 5,544,319 A | 8/1996 | Acton et al. | 709/246 |
| 5,581,732 A | 12/1996 | Dann | 711/148 |
| 5,761,705 A * | 6/1998 | DeKoning et al. | 711/113 |
| 6,094,709 A | 7/2000 | Baylor et al. | 711/141 |
| 6,122,713 A | 9/2000 | Huang et al. | 711/147 |

(Continued)

OTHER PUBLICATIONS

S. Petit, et al., "Characterizing Parallel Workloads to Reduce Multiple Writer Overhead in Shared Virtual Memory Systems," Proceedings of the 10$^{th}$ Euromicro Workshop on Parallel, IEEE, 2002, 8 pages.

(Continued)

*Primary Examiner*—Mano Padmanabhan
*Assistant Examiner*—Mardochee Chery
(74) *Attorney, Agent, or Firm*—Robert C. Kowert; Meyertons, Hood, Kivlin, Kowert & Goetzel, P.C.

(57) ABSTRACT

Various embodiments of systems and methods for performing write cache mirroring may involve accessing different mapped regions within a memory. The memory controller may automatically mirror write requests to another memory. Write requests targeting one mapped region may be verified such that local completion of the write indicates that the mirrored write has also completed. Write requests targeting another mapped region may be unverified. Unverified writes may be verified by performance of a verified write.

68 Claims, 17 Drawing Sheets

U.S. PATENT DOCUMENTS

| | | | |
|---|---|---|---|
| 6,170,030 B1 * | 1/2001 | Bell | 710/310 |
| 6,446,149 B1 | 9/2002 | Moriarty et al. | 710/110 |
| 6,457,100 B1 | 9/2002 | Ignatowski et al. | 711/119 |
| 6,594,736 B1 | 7/2003 | Parks | 711/151 |
| 6,675,262 B1 | 1/2004 | Wilson et al. | 711/135 |
| 6,711,652 B1 | 3/2004 | Arimilli et al. | 711/141 |
| 6,738,872 B1 | 5/2004 | Van Huben et al. | 711/150 |
| 6,795,850 B1 | 9/2004 | Wu et al. | 709/213 |
| 2003/0126381 A1 | 7/2003 | Vo | 711/152 |
| 2004/0117562 A1 | 6/2004 | Wu et al. | 711/147 |
| 2004/0117579 A1 | 6/2004 | Wu et al. | 711/170 |

OTHER PUBLICATIONS

Khawar M. Zuberi, et al, "An Efficient Semaphore Implementation Scheme for Small-Memory Embedded Systems," IEEE, 1997, pp. 25-34.

"Sun Storeddge A1000/D1000, Detailed View," printed from http://www.sun.com/storage/workgroup/a1000/details.html, Jun. 25, 2002, 24 pages.

"VA 7100 Hardware High Availability Features," Hewlett-Packard Company, White Paper, Jun. 2001, 16 pages.

"Fast Locks in Distributed Shared Memory Systems," Appeared in HICSS Jan. 1994, 12 pages.

* cited by examiner

| Mirrored | Array controller and partner array controller have copy in reflected region and partner reflected region respectively and on-disk copy is out-of-date |
|---|---|
| Shared-Clean | Array controller has copy and on-disk copy is up-to-date |
| Shared-Dirty | Array controller has copy and on-disk copy is out-of-date |
| Invalid | Array controller does not have copy |

*FIG. 11*

Coherence Information Entry 1300A

| LUN ID 1301 | Logical Block Address 1303 | State 1305 | Sharer/Owner ID 1307 |

FIG. 13

Coherence Information Entry 1300B

| Cache Block ID 1311 | Tag 1313 | State 1305 | Sharer/Owner ID 1307 |

FIG. 14

Words sent by interface 30A:

| Request 1600A | Data 1700A1 | Data 1700A2 | Data 1700A3 | Data 1700A4 | Request 1600B | Data 1700B1 | Data 1700B2 | ... | Data 1700Bn | Idle 1750A |
|---|---|---|---|---|---|---|---|---|---|---|

Words sent by interface 30B:

| Request 1600C | Data 1700C1 | Data 1700C2 | Idle 1750B | Idle 1750C | Idle 1750D | Idle 1750E | Request 1600D | Data 1700D1 | Request 1600E | Data 1700E1 | Request 1600F | Data 1700F1 |
|---|---|---|---|---|---|---|---|---|---|---|---|---|

FIG. 17

SYSTEM AND METHOD FOR EFFICIENTLY AND RELIABLY PERFORMING WRITE CACHE MIRRORING

BACKGROUND OF THE INVENTION

1. Field of the Invention

This invention relates to distributed shared memory systems and, more particularly, to a memory mapping scheme for use in a distributed shared memory system.

2. Description of the Related Art

Wide varieties of storage devices are used in modern computer systems. Such storage devices include individual hard drives, storage arrays, and tape drives. Each type of storage device may have an associated storage controller that controls how that storage device is accessed by a host computer. For example, a hard drive typically includes an integrated storage controller that controls how a hard disk included in that hard drive is accessed. A storage array may include several hard drives and one or more storage controllers that each control how individual hard drives within the storage array are accessed.

Often, storage controllers include a write cache that temporarily buffers data being written to a storage device by a host computer. A write cache may be accessed more quickly than a larger non-volatile storage media within the storage device, allowing a storage controller to handle a write access more quickly than if the write was actually performed to the storage media. Furthermore, if the data is subsequently requested again before being written from the write cache to the non-volatile storage media, the storage controller may more quickly provide the data to the host computer from the write cache than it could from the non-volatile storage media. However, using a write cache may also lead to increased data vulnerability. For example, most storage controllers acknowledge completion of a write access after buffering the write data in the write cache, even though the write data has not actually been written to the non-volatile storage media. If the storage controller experiences a failure before the write data is written to the non-volatile storage media, that data may be lost.

In order to provide protection against data losses due to write cache failures, some storage controllers implement write-cache mirroring techniques. For example, two array controllers may control access to a storage array. If one of the array controllers receives write data, that array controller may generate a write access to the other array controller's write cache so that both array controllers' write caches contain the same write data. Accordingly, if one array controller fails, the other array controller's write cache will still have a valid copy of the data. In order to make sure that copies of the write data are mirrored in both write caches, an array controller may not acknowledge the write access until the cache mirroring is complete.

While cache mirroring may provide improved reliability, it may also have detrimental effects on storage device performance. For example, the time required to communicate the mirrored cache write may substantially increase the time required to perform a write access. Additionally, such cache mirroring techniques may consume an undesirable amount of bandwidth, both within each storage controller (e.g., processor intervention is typically needed to generate an external I/O operation) and on an external communication link coupling the storage controllers (e.g., this link is typically the link used to couple the storage controllers to the storage devices).

Write cache coherency is an additional concern that arises when using cache mirroring techniques. If different storage controllers are caching different versions of the same data, a write access to that data may return stale data unless there is some way of determining which storage controller is caching the most recent version of the data. Furthermore, performing such a determination may itself decrease performance. These concerns are typical of distributed shared memory (DSM) systems in which processing devices share access to each other's memories and copies of the same data may exist in multiple memories.

Accordingly, it is desirable to be able to provide new cache mirroring techniques for use in storage controllers and to provide new ways of controlling access to shared data in DSM systems, particularly those involving storage controllers.

SUMMARY

Various embodiments of systems and methods for performing write cache mirroring may involve accessing different mapped regions within a memory. The memory controller may automatically mirror write requests to another memory. Write requests targeting one mapped region may be verified such that local completion of the write indicates that the mirrored write has also completed. Write requests targeting another mapped region may be unverified. Unverified writes may be verified by performance of a verified write. For example, in one embodiment, a storage controller may include: a processing device; a memory controller coupled to the processing device; and a memory coupled to the memory controller. The processing device is configured to send one or more reflected write requests followed by a semaphore write request to the memory controller in response to receiving a host write request. In response to receiving the reflected write request(s) from the processing device, the memory controller is configured to perform responsive write access(es) to a reflected region of the memory and to forward the reflected write request(s) to another memory controller. In response to receiving the semaphore write request, the memory controller is configured to forward the semaphore write request to the other memory controller and to delay performance of a responsive write access to a semaphore region of the memory until the memory controller receives an indication that the other memory controller has completed the semaphore write request.

In some embodiments, a system may include: a host computer system configured to generate a host write request; a node coupled to the host computer system and comprising a memory controller, a memory, and a processing device; and a partner node comprising a partner memory controller and a partner memory, where the partner memory controller is coupled to the memory controller by an interconnect. The processing device is configured to send one or more reflected write requests followed by a semaphore write request to the memory controller in response to the node receiving the host write request generated by the host computer system. In response to receiving a reflected write request, the memory controller is configured to perform a write access to a reflected region of the memory and to convey the reflected write request to the partner memory controller via the interconnect. In response to receiving the semaphore write request, the memory controller is configured to convey the semaphore write request to the partner memory controller via the interconnect and to delay performing a write access to a semaphore region of the local memory until the partner memory controller performs a write access to the partner memory in response to the semaphore write request.

One embodiment of a method may involve: a storage controller receiving a host write request from a host computer system, where the storage controller includes a processing device, a memory controller, and a memory; in response, the processing device sending to the memory controller one or more write requests targeting a reflected region of the memory followed by a semaphore write request targeting a semaphore region of the memory; the memory controller forwarding the write request(s) to a partner memory controller included in another storage controller and broadcasting the semaphore write request to one or more other memory controllers including the partner memory controller; the memory controller accessing the reflected region of the memory in response to the write request(s) prior to accessing the semaphore region of the memory in response to the semaphore write request; and the memory controller delaying accessing the semaphore region of the memory in response to the semaphore write request until each of the one or more other memory controllers complete an access to a respective other memory in response to the semaphore write request.

BRIEF DESCRIPTION OF THE DRAWINGS

A better understanding of the present invention can be obtained when the following detailed description is considered in conjunction with the following drawings, in which:

FIG. 11 is a table showing various cache coherency states that may be implemented in some embodiments.

FIG. 13 shows a coherence information entry that may be used in one embodiment.

FIG. 14 shows another coherence information entry that may be used in some embodiments.

FIG. 17 demonstrates how idle words and request words may be used to handshake the delivery of messages through the inclusion of forward and back channel error information in some embodiments.

While the invention is described herein by way of example for several embodiments and illustrative drawings, those skilled in the art will recognize the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims. The headings used herein are for organizational purposes only and are not used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
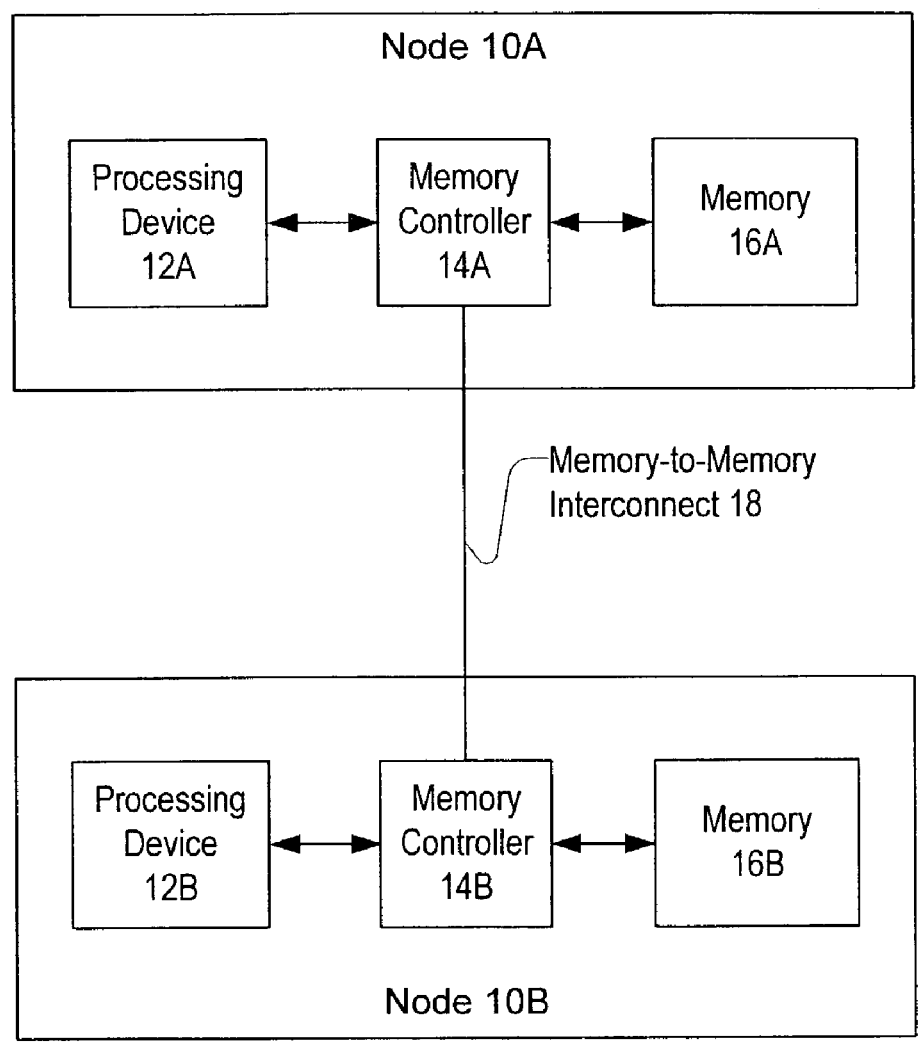
FIG. 1 shows two nodes that may be included in a DSM (Distributed Shared Memory) system, according to one embodiment.

FIG. 1 shows one embodiment of a distributed shared memory (DSM) system. Two nodes, node 10 and node 10B, are illustrated. In some embodiments, nodes 10A and 10B may each be configured as a storage controller (e.g., an array controller or a disk drive controller). Node 10A includes a processing device 12A, a memory controller 14A, and a memory 16A. Similarly, node 10B includes a processing device 12B, a memory controller 14B, and a memory 16B. Note that other embodiments may include significantly more nodes 10 than are illustrated in FIG. 1. Additionally, note that a node may include other devices that are not shown in FIG. 1. For example, each node may include one or more interfaces to other interconnects that couple that node to devices such as another computer system, a storage system, etc. Throughout this disclosure, devices identified by the same reference numeral followed by a unique alphabetic identifier (e.g., nodes 10A and 10B) may be collectively referred to by the reference numeral alone (e.g., nodes 10).

Processing devices 12 may include devices such as microprocessors and ASICs (Application Specific Integrated Circuits). In some embodiments, memory controller 14 may be integrated within processing device 12. The memory controllers 14 are coupled by a memory-to-memory interconnect 18. Memory controllers 14 may initiate communication transactions (e.g., by sending structured messages) on the memory-to-memory interconnect 18 without the intervention of a processing device 12.

Devices included in the same node, and operations initiated by those devices, are described herein as being "local." For example, memory controller 14A's local memory is memory 16A. Devices that are included in different nodes are described herein as being "remote." Operations initiated by a remote device and requested via memory-to-memory interconnect 18 are also described herein as being "remote." For example, a write access request generated by memory controller 14B and provided to memory controller 14A via memory-to-memory interconnect 18 is a remote write access request when seen by memory controller 14A.

Various accesses may be performed within memory 16. Accesses include read accesses and write accesses of various sizes (e.g., bits, bytes, words, blocks, etc.). An access is initiated in response to an access request received by the memory controller 14, either directly from the processing device 12 or from another device via a local bus within the node (not shown). Access requests received in this way are described as being "local" (because the memory controller receives these access requests over an internal bus or interconnect within the node), while access requests received via the memory-to-memory interconnect 18 are described as being "remote."

Memory Mapping

Figure 2:
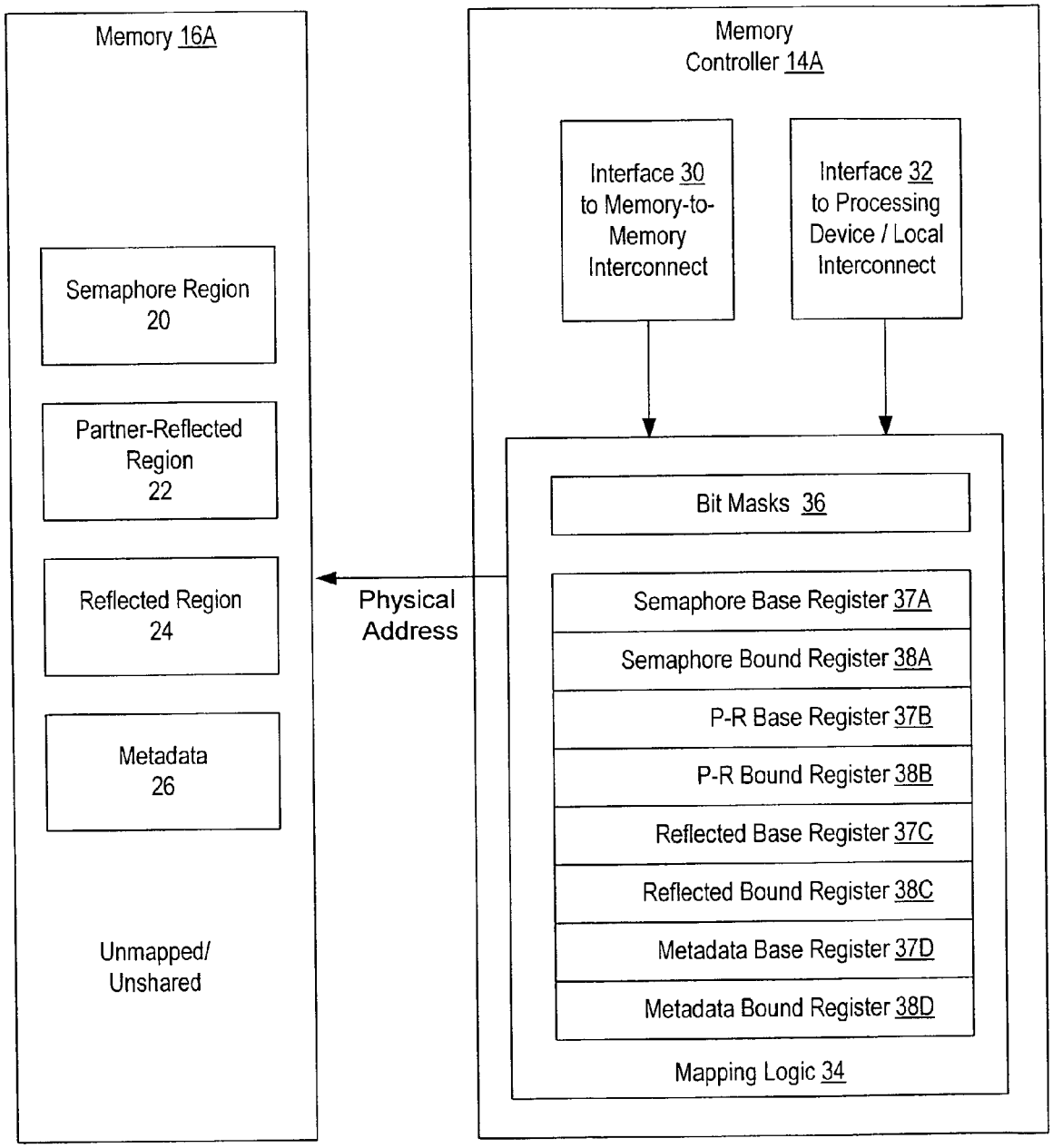
FIG. 2 shows a memory mapping that may be implemented in one embodiment.

FIG. 2 shows a memory mapping that may be implemented in some embodiments. As indicated, memory 16A may include several mapped memory regions: semaphore region 20, partner-reflected region 22, reflected region 24, and metadata region 26. Each mapped memory region may be shared with one or more other nodes.

In one embodiment, each shared region may occupy a set of contiguous physical memory addresses. Memory controller 14A may include mapping logic 34 in order to control each local memory access request targeting memory 16 dependent on which mapped region, if any, that local memory access request targets. Mapping logic 34 may be configured by processing device 12 via interface 32. Such mapping logic may include base address registers 37A–37D and bound address registers 38A–38D that specify the range of each shared region. In other embodiments, shared regions may have more complex mappings within each memory 16. For example, some shared regions may occupy several discontinuous physical memory addresses, and memory controller 14 may include appropriate mapping logic to detect which mapped region, if any, a received memory access request targets.

Some portions of memory 16 may not be mapped to a particular shared region. These unmapped regions may not be shared with other nodes. Additionally, unmapped areas may be discontinuous in physical memory.

Memories 16 in different nodes 10 may include the same shared address regions. Furthermore, shared address regions in different memories 16 may be the same size. In some embodiments, however, different memories 16 in different nodes 10 may have different mappings for each region. For example, the semaphore region base and bound address values maintained by memory controller 14A may differ from those maintained by memory controller 14B. Memory controller 14A may include a remapping mechanism that is configured to remap a remote write request generated by a remote memory controller (received via an interface 30 to the memory-to-memory interconnect 18) to the proper physical address within a local memory 16A. Note that in some embodiments, base and bound values for one or more of the shared memory regions may be stored in memory 16A (e.g., within metadata region 26) instead of or in addition to being stored in registers within memory controller 14A.

In some embodiments in which shared memory regions are contiguous and specified by base and bound values, each memory controller 14 may include a bit mask 36 for each shared region indicating which bits, if any, of a write address included in a remote write access request should be replaced with locally-generated address bits in order to appropriately access the specified region. For example, one or more bits of the write address received in a remote write access request may be replaced with bits stored in the base address register for the specified region.

Each shared region may be used to store a particular type of data. For example, the processing device 12A may store modified user data in reflected region 24. At some subsequent time, processing device 12A may write the modified user data to a non-volatile storage device for long-term preservation. Thus, the reflected region 24 may be used as a write cache. Partner-reflected region 22 may store modified user data written to a partner node's write cache. Two or more nodes may be designated as "partner" nodes in order to implement write-cache mirroring between those nodes. Semaphore region 20 may be used to store information identifying the current status of lock arbitration for access to a resource that is shared between multiple nodes. Metadata region 26 may be used to store control and configuration data that is shared by multiple nodes. For example, if multiple nodes may have a copy of the same unit (e.g., bit, byte, word, block) of data at the same time, metadata region 26 may be used to store coherence information identifying the access rights (e.g., read, write, invalid) each node has to its copy of that unit of data.

Typical reads and writes to different shared regions may have different sizes (e.g., indicated by a burst size selected for each access or a number of consecutive accesses performed to successive addresses within the same region). For example, in one embodiment, writes to reflected region 24 and partner-reflected region 22 may typically involve several kilobytes of data. In contrast, writes to semaphore region 20 and metadata region 26 may typically involve several words of data.

Each shared memory region 20-26 may be accessed accordingly to a specific set of access constraints. For example, when memory controller 14A detects a write to the reflected region 24, the memory controller 14A may automatically send a corresponding write access request targeting the partner-reflected region 22 of a partner memory 16B in partner node 12B over the memory-to-memory interconnect 18. Thus, the contents of reflected region 24 are automatically mirrored to a mapped region within a partner node by the memory controller hardware. In some embodiments, the memory controller may not initiate writes to reflected region 24 in response to communications received via the memory-to-memory interconnect 18 (unless, for example, the partner-reflected region overlaps with the reflected region). In embodiments in which only one node may initiate write accesses to the reflected region 24, write contention between multiple nodes may be avoided.

Note that in some embodiments, a node may have more than one partner node. In such embodiments, detection of a write to reflected region 24 may result in memory controller 14A sending corresponding write access requests to the partner-reflected regions of each of the partner nodes' memories. Each memory controller 14 may be configured to send and receive such write requests on the memory-to-memory interconnect 18 without the intervention of processing device 12. For example, each memory controller 14 may include an interface 30 to the memory-to-memory interconnect that allows that memory controller 14 to directly send and receive write requests on the memory-to-memory interconnect 18.

The partner-reflected region 22 may be used to mirror the content of the reflected region within a partner node's memory 16B. The memory controller 14A may be configured to update the contents of partner-reflected region 22 in response to a write request received from partner controller 14B via the memory-to-memory interconnect 18. Memory controller 14A may be configured to perform read accesses to partner-reflected region 22 in response to local reads. In embodiments in which node 10A has several partner nodes, memory 16A may include a distinct partner-reflected region 22 for each partner node. In some embodiments, some memories may include either a reflected region 24 or a partner-reflected region 22 but not both. For example, one memory that includes a reflected region 24 may be included in a primary node that responds to host requests while another memory that includes a partner-reflected region 22 may be included in a backup node that merely mirrors the write cache of the master node (unless the master node fails).

In some embodiments, a write access targeting the reflected region 24 of a local memory may complete without regard to when the mirrored write access completes in the partner-reflected region 22. In other words, mirrored write accesses may not be ordered with respect to each other in many embodiments. For example, memory controller 14A may write reflected region 24 of memory 16A either before or after memory controller 14B writes partner-reflected region 22 of memory 16B in response to receiving the corresponding write request from memory 16A via the memory-to-memory interconnect 18. Note that completion of a write access to reflected region 24 may not provide any information about completion of a corresponding write access to the partner-reflected region of a partner node, and vice versa.

Figure 3:
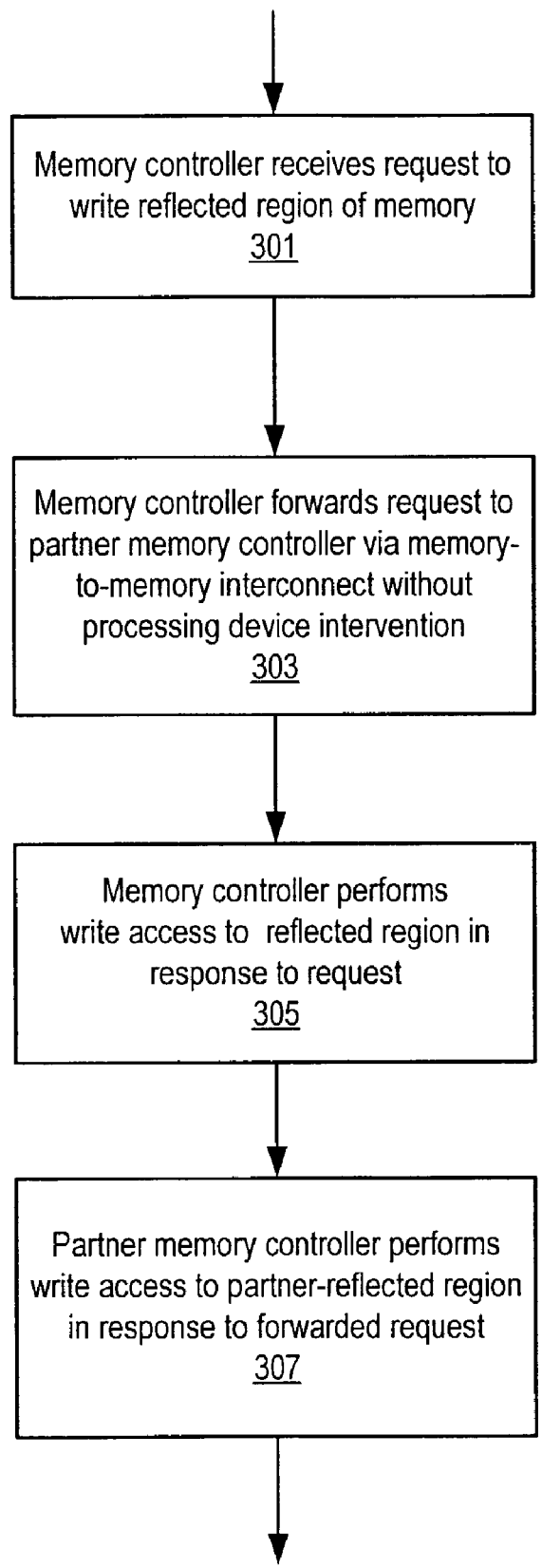
FIG. 3 is a flowchart illustrating one embodiment of a method of performing write access to a reflected region of shared memory.

FIG. 3 shows one embodiment of a method of performing a write access to the reflected region of memory. At 301, a memory controller receives a request to perform a write access to a reflected region of memory. In response, the memory controller forwards the request to a partner memory controller via a memory-to-memory interconnect. As shown at 303, the memory controller may forward the request without the intervention of a processing device. The memory controller and the partner memory controller perform the write access. The memory controller that receives the request at 301 performs the write access in the reflected region of a local memory, as shown at 305. The partner memory controller that receives the forwarded request performs the write access in a partner-reflected region, as indicated at 307. Note that the memory controller and the partner memory controller may perform their respective write accesses at substantially the same time (assuming the delay over the memory-to-memory interconnect is insignificant). The memory controller may be configured to perform function 303 before, during, or after performance of function 305. Furthermore, functions 305 and 307 may be performed in any order.

Returning to FIG. 2, memory controller 14A may read and write the semaphore region 20 in order to participate in lock arbitration as well as to determine the outcome of particular lock arbitrations. Semaphore region 20 may also (or, in some embodiments, alternatively) store control and/or status information. The content of the semaphore region 20 is identical within each node 10. Semaphore region 20 may be partitioned into N subregions, where N is the number of nodes included in the system. In some embodiments, the partitioning may be implemented in hardware (e.g., through the use of additional base and bound address registers within memory controller 14A). In other embodiments, firmware executing on processing device 12A may statically partition the semaphore region 20 into N subregions when the node is powered on. For example, in one embodiment, firmware may read the number of nodes from a ROM (Read Only Memory) included in the node and use that number to perform the semaphore region partitioning. Address values identifying the size, locations, and/or relationships between the partitions may be stored in metadata region 26 in one embodiment. Use of the partitions in the semaphore region 20 may prevent write contention between multiple nodes.

The content of the semaphore region 20 is locally readable within all nodes. However, each of the N subregions is only locally writeable by a single controller with which that subregion is associated. When a local write to node 12A's subregion within semaphore region 20 is detected, the memory controller 14A automatically broadcasts the write request to each other node's memory controller via the memory-to-memory interconnect 18. Additionally, the memory controller 14A delays performing the local write access until all of the remote write accesses have completed. This way, each access to the semaphore region completes atomically (i.e., the semaphore write does not complete locally unless it has completed remotely). When semaphore region 20 is used to perform lock arbitration, completion of the local write access may unambiguously indicate the result of the lock arbitration.

Figure 4:
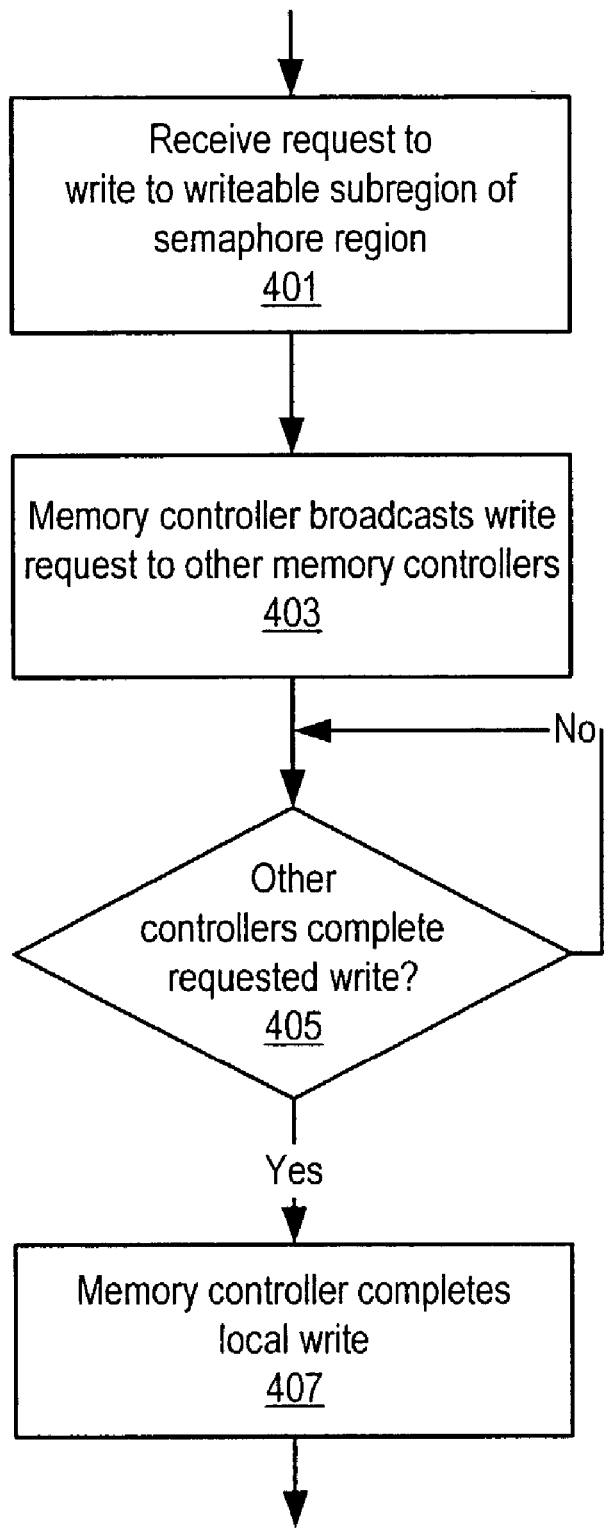
FIG. 4 is a flowchart of one embodiment of a method of performing write access to a semaphore region of shared memory.

FIG. 4 illustrates how a memory controller may perform a write access to the semaphore region of a local memory in one embodiment. At 401, a memory controller receives a local request (e.g., over a local bus from a processing device internal to the node) to initiate a write to a writeable subregion within the semaphore region. In response to receiving the request, the memory controller broadcasts the request to other nodes' memory controllers, as indicated at 403. The memory controller then waits until the other nodes' memory controllers perform the write access specified in the request, as indicated at 405. In some embodiments, the memory controller may determine that each other node's memory controller has completed the write access when it receives an indication that each other node has completed the remote write access. For example, in one embodiment, the memory-to-memory interconnect may couple memory controllers in a ring topology. The request may be included in a communication sent to each other memory controller in the ring. If each other memory controller performs the remote write access, the communication may be returned to the initiating memory controller with a flag set to indicate that, instead of being sent to initiate another write access to the semaphore region, this write request is being sent to indicate completion of the requested write access at all of the other nodes. If the memory controller does not determine that the other nodes' memory controllers have completed the write access within a timeout period, the memory controller may generate an error indication (e.g., via an interface to a local bus and/or processing device).

Once the memory controller has determined that the other nodes' memory controllers have completed the requested write access, the memory controller may perform the write access to the local memory, as shown at 407. Accordingly, completion of the semaphore write access does not occur locally until the write access has completed in all remote memories.

Figure 4A:
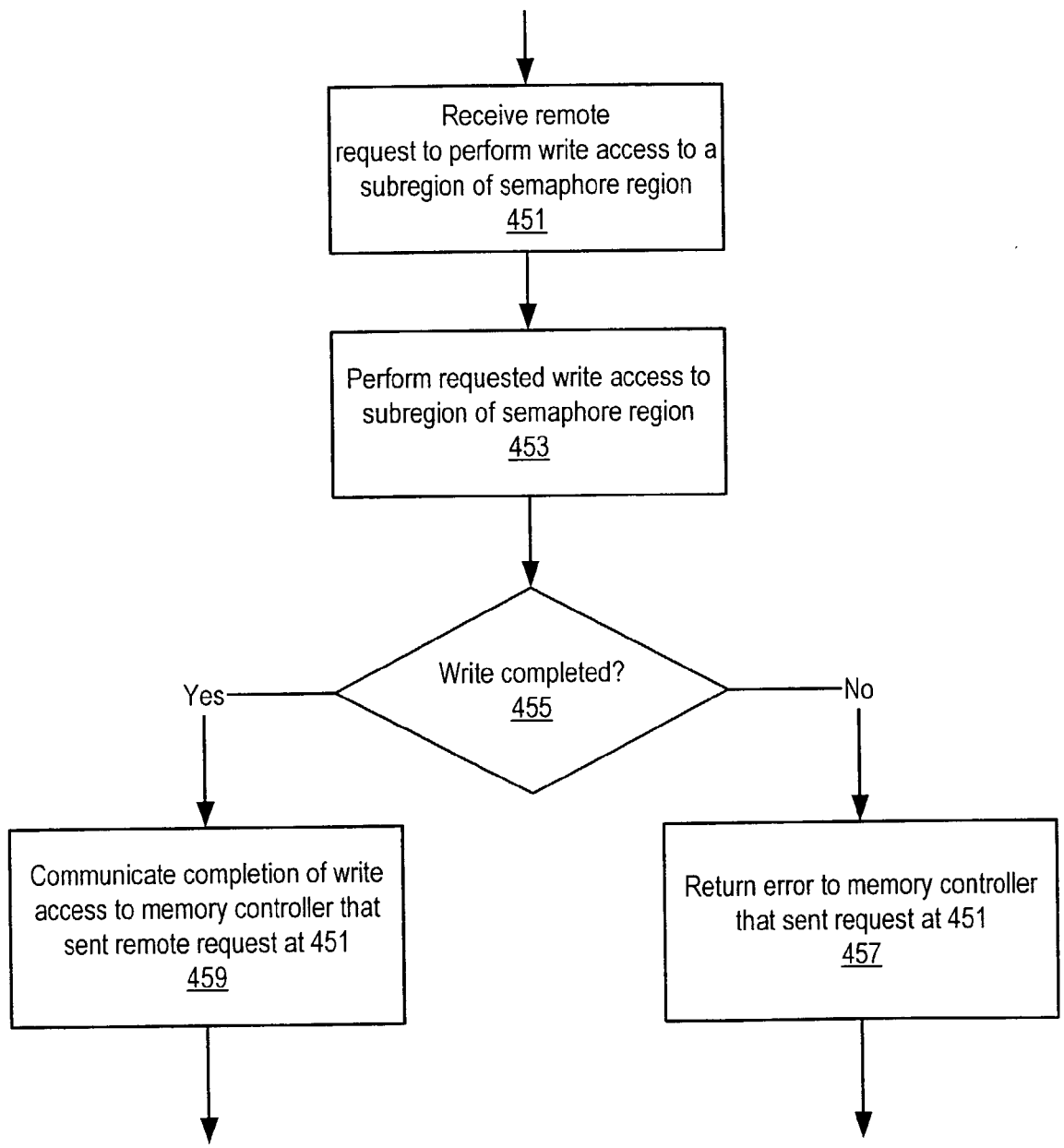
FIG. 4A is a flowchart of one embodiment of a method for responding to a remote write access request to a semaphore region of shared memory.

FIG. 4A illustrates one embodiment of a method of performing a write access to the semaphore region of a local memory in response to a remote write request. At 451, a remote request to perform write access to a subregion of the semaphore region is received via a memory-to-memory interconnect. The remote request may be sent by a node that has local write access to the targeted subregion. The targeted subregion of the semaphore region may only be written by the receiving memory controller in response to receiving a remote write request from another memory controller (i.e., write access to the targeted subregion may not be initiated locally). In response to receiving the remote request, the requested write access may be performed, as shown at 453. When the write access is completed, the memory controller may communicate the completion of the write access to the memory controller that sent the remote write request, as indicated at 455 and 459. If the write is not completed, an error message may be returned to the memory controller that sent the remote write request, as shown at 455 and 457. In some embodiments, the write may be retried if the write access does not complete.

Returning to FIG. 2, the metadata region 26 may be reserved for sharing coherence information (e.g, by indicating the cache block ID, LBA (Logical Block Address), and coherence state of each block of data currently cached in each node's write cache), memory mapping information, and/or other control and status information, such as system-wide error information. In one embodiment, the information stored in the metadata region 26 may identify the granularity of each mapped memory region, the base and bound address of each mapped region, the size of each region, and other global information that is used during initialization or error recovery. As with the semaphore region 20, reads to the metadata region 26 may be initiated locally (e.g., in response to read requests received by the memory controller on an internal communication medium) and writes may be initiated both locally and remotely. When a request for write access to the metadata region 26 is detected, the memory controller 14A automatically broadcasts the write request to the other nodes' memory controllers via the memory-to-memory interconnect 18.

Since any node may initiate an access to an address in the metadata region, write contention may arise if multiple nodes attempt to access the same address at the same time. To avoid contention between nodes, each node may be configured to acquire a write lock before initiating write access to the metadata region. For example, the nodes may associate a set of N subregions of the semaphore region with each writeable address in the metadata region. Each of the N subregions may be writeable by a different one of the N nodes. Before writing to a particular address in the metadata region, a node may acquire a write lock by writing to its writeable one of the associated N subregions. The node may determine whether any other node currently has (or is requesting) a write lock on that metadata region by reading the N−1 read-only subregions of the associated set of subregions.

Unmapped portions of memory 16 may be used as non-shared regions. For example, a read cache may be implemented within an unmapped region of memory 16. Note that data transfers between unmapped and shared regions may initiate the specialized operations described above. Furthermore, memory accesses affecting a shared region may have effects on data stored in an unmapped region. For example, a local copy of a unit of data stored in a read cache implemented within an unmapped region may be invalidated in response to a modified copy of that unit of data being written to the reflected region (e.g., write cache) of another node's local memory.

Storage System

Figure 5:
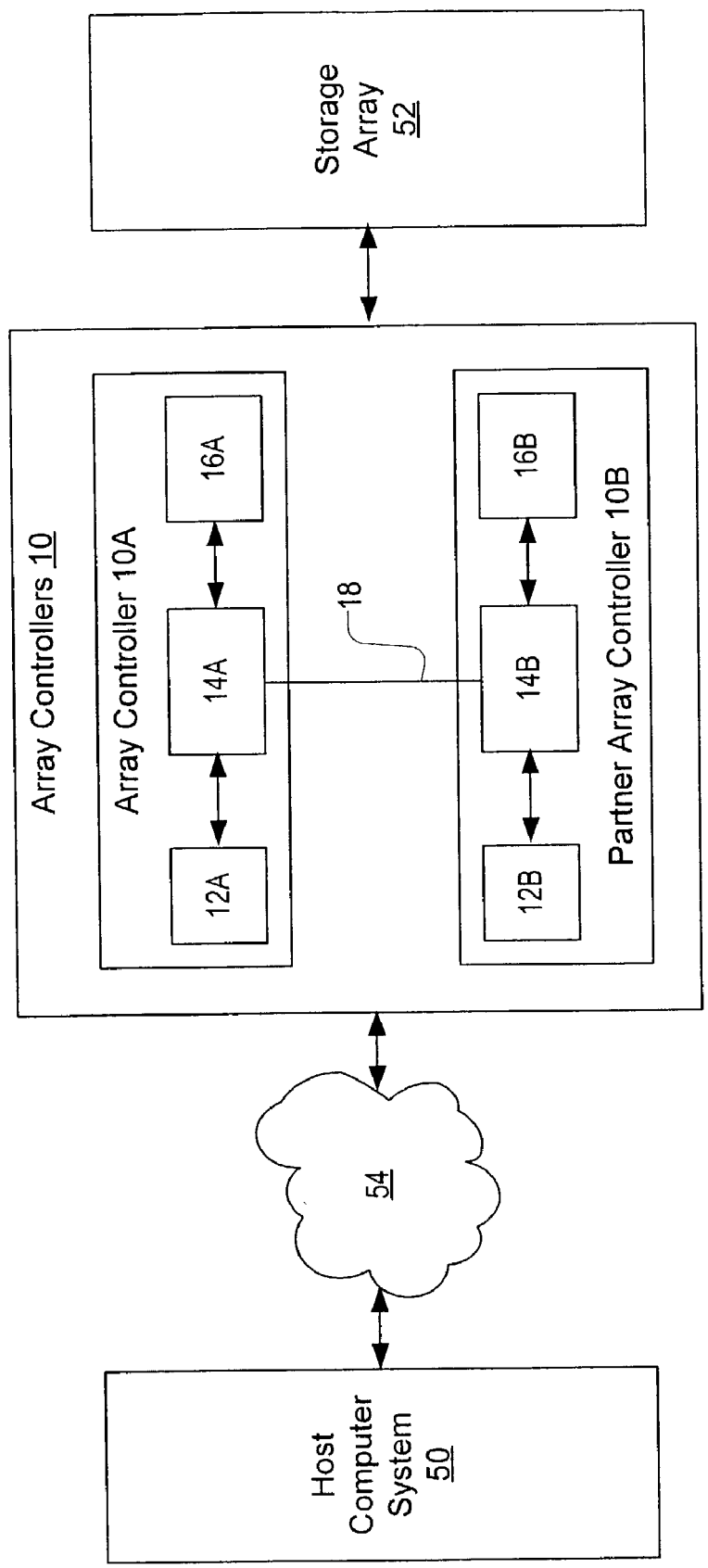
FIG. 5 illustrates one embodiment of a storage system.

FIG. 5 is a block diagram of one embodiment of a storage system. In this embodiment, the storage system includes a host computer system 50, which is coupled to a pair of array controllers 10A and 10B. Each array controller is configured as a node in a DSM system. Furthermore, array controllers 10 may be configured as partner nodes in order to implement write cache mirroring between the nodes. Array controllers 10 control access to a storage array 52. Storage array 52 may be a simple JBOD (Just a Bunch of Disks) array in one embodiment. In other embodiments, array controllers 10 may control the storage array 52 as a RAID (Redundant Array of Independent Disks) system. Each individual storage device included in storage array 52 may be identified by a unique identifier (e.g., a LUN (Logical Unit Number)). The host computer system 50 is coupled to the array controllers 10 via a network 54.

In one embodiment, one array controller 10A may be configured to operate as the primary array controller by performing read and write accesses to storage array 52 in response to all host access requests received via network 54. In such embodiments, array controller 10B may perform primarily backup functions (e.g., maintaining a mirrored copy of array controller 10A's write cache and monitoring the status of array controller 10A) while array controller 10A is operational. In other words, the storage system may be implemented as an active-passive system. If array controller 10A fails, array controller 10B may take over the primary array controller functions. In alternative embodiments, the storage array may be implemented as a symmetric system in which array controllers 10 may both perform primary array controller functions such as accessing storage array 52 in response to host requests. Both array controllers 10 may also mirror each other's write caches in such an embodiment.

Figure 6:
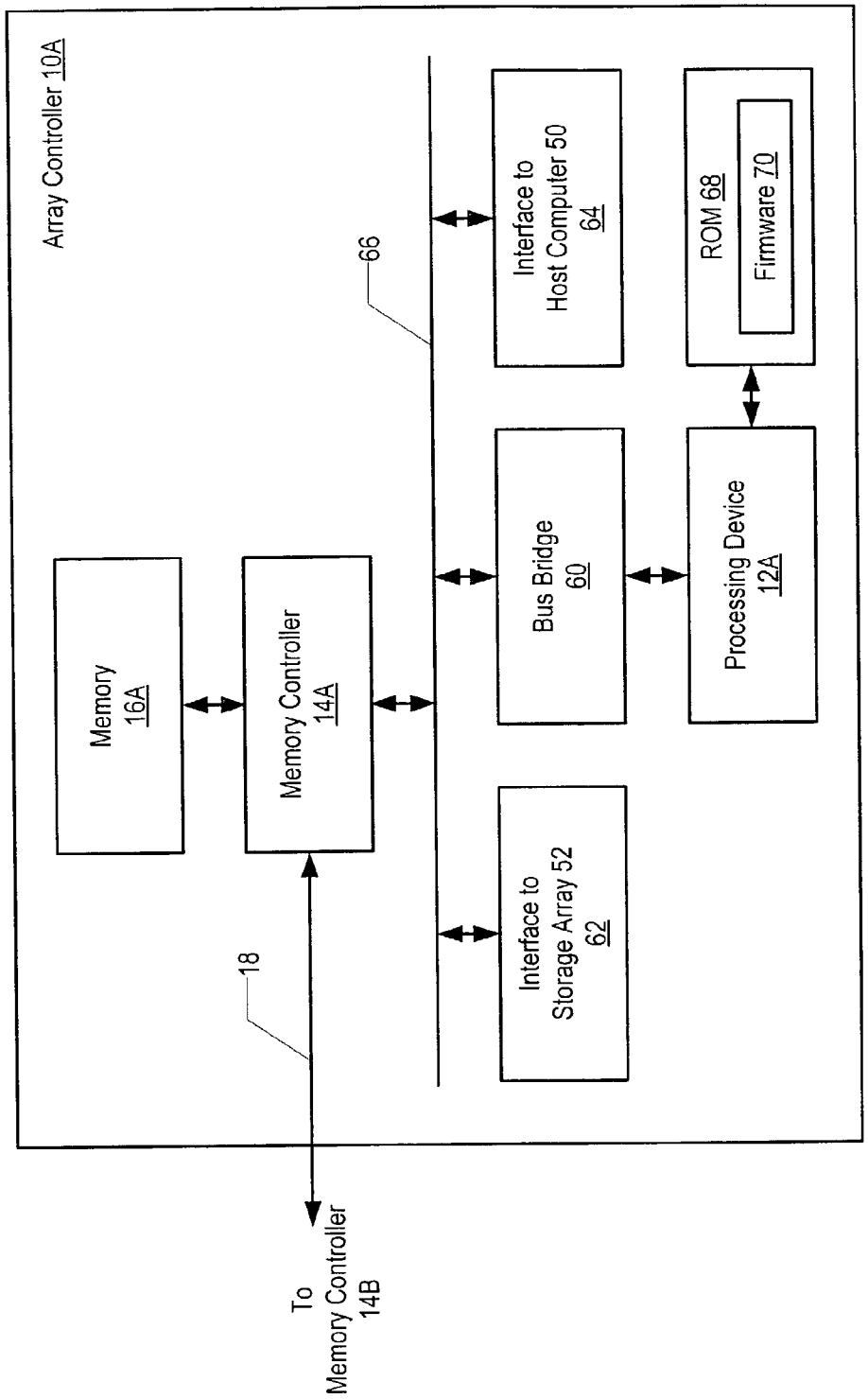
FIG. 6 is a block diagram of an array controller according to one embodiment.

FIG. 6 shows a more detailed block diagram of an array controller 10A, according to one embodiment. In this embodiment, array controller 10A includes a memory 16A, a memory controller 14A, a bus bridge 60, a local bus 66, a processing device 12A, an interface 64 to host computer system 50, and an interface 62 to storage array 52. Memory controller 14A includes an interface (not shown) to memory-to-memory interconnect 18, which couples memory controller 14A to memory controller 14B (also not shown). Memory controller 14A is configured to initiate transactions on the memory-to-memory interconnect 18 without intervention from processing device 12A.

Array controller 10A may receive access requests from host computer 50 via interface 64. Processing device 12A and/or memory controller 14A may perform one or more operations in response to each access request received via interface 64. Processing device 12A may convey an acknowledgement or an error message to host computer system 50 depending on the outcome of each operation and/or the type of memory access requested. Array controller 10A may send data to and receive data from storage array 52 via interface 62. In one embodiment, interfaces 62 and 64 may each be coupled to a Fibre Channel Arbitrated Loop (FC-AL).

Access requests received from host computer 50 may include read and write access requests for data in storage array 52. Array controller 10A may cache readable and/or writeable copies of data from storage array 52 in memory 16A. Read-only copies of data may be cached in an unshared region within memory 16A, while writeable copies of data may be cached in a reflected region of memory. Memory 16A may also include a semaphore region and/or a metadata region. Memory controller 14A may control access to the various regions of memory 16A and generate communication transactions on memory-to-memory interconnect 18 as described above.

Processing device 12A may execute firmware instructions 70 (e.g., stored in a ROM (Read Only Memory) 68 included in array controller 10A). The firmware 70 may be executable to initiate one or more read and write accesses to memory 16A in response to the array controller 10A receiving a memory access request from host computer 50.

The firmware 70 executing on processing device 12A may determine which address ranges are assigned to each shared region within memory 16A (e.g., by reading values of base and bound address values maintained for each memory region). Depending on the type (e.g., read or write) of access request received from the host computer system 50 and the region targeted by that access request, the firmware 70 may initiate additional types of read and/or write accesses in one or more regions of memory 16A. Note that the memory controller 14A also initiates additional read and/or write accesses via the memory-to-memory interconnect in response to access requests targeting particular shared regions of memory 16A, as described above. Thus, the memory mapping may be used by both firmware 70 and hardware 14A to determine what additional actions to perform, if any, in response to a given access request.

Whenever a write request is received from the host computer 50 (e.g., targeting an LBA on a particular LUN within storage array 52), the firmware 70 may initiate a write access to an address within the reflected region of memory 16A. When memory controller 14A receives the write access request specifying an address within the reflected region of memory 16A, the memory controller 14A may automatically reflect the write access request and the data to be written to a partner memory controller 14B via the memory-to-memory interconnect 18. The partner memory controller 14B may responsively store the data in the partner-reflected region of memory 16B.

The firmware 70 may return an acknowledgement to the host computer system 50 that generated the write request upon completion of the write access to the reflected region of memory 16A. In order to ensure that the write cache mirroring has completed before acknowledging the host's write request, the firmware 70 may delay acknowledgment of the write request until completion of a semaphore write initiated after the requested write access. Each memory controller 14 may implement an ordering constraint in which a memory controller must perform requested memory accesses in order (i.e., memory controller 14A may not perform a later-requested write access before an earlier-requested write access completes). Since the memory controller 14A will not complete the semaphore write access locally until memory controller 14B completes the remote semaphore write access, and since memory controller 14B will not perform the semaphore write access until completion of the partner-reflected region write access (based on the ordering constraint), completion of the semaphore write access indicates that the write cache mirroring was successful. Note that if the reflected write access involves one or more large blocks of data and the semaphore write access involves a significantly smaller amount of data (e.g., a byte), using a semaphore write to verify the write cache mirroring may involve relatively little overhead.

Note that in some embodiments, a single host write request may involve performance of several write accesses by memory controller 14A. For example, a normal host-initiated I/O write operation may result in several data transfers on internal bus 66. The memory controller 14A may monitor the internal bus 66 to perform individual write accesses to the reflected region of memory 16A and to automatically reflect data across the memory-to-memory interconnect 18 to memory controller 14B for each internal bus 66 transfer. As each internal bus 66 transfer completes, a new block transfer for that I/O operation may be initiated. Upon completion of the final internal bus transfer for the I/O operation, the firmware 70 may generate a semaphore write request. Firmware 70 may then read the portion of the semaphore region written by that write request to determine whether the semaphore write completed. If the semaphore write was successful, the firmware 70 may return an acknowledgment to the host 50 via interface 64. Thus, firmware 70 may only perform one semaphore write for each I/O operation.

Firmware 70 may choose one of several options to recover from the failure of a semaphore write to complete. For example, in one embodiment, the firmware 70 may be configured to retry the write cache mirroring using an alternative link to the partner array controller (e.g., via a Fibre Channel link coupling both array controllers to the storage array 52). Alternatively, the firmware 70 may flush data for all cached writes (e.g., all valid data in the reflected region 24) to storage array 52 and acknowledge the outstanding write operations to the host. In yet another embodiment, the firmware 70 may communicate a retry request to the host 50 for all outstanding write operations. Any one of these options may ensure that any acknowledged data will not be lost in the event of the failure of array controller 10A. After retrying the write operations or flushing the write cache, an array controller may reset and/or verify the memory-to-memory interconnect 18. While the memory-to-memory interconnect is being reset and/or verified, the array controller may switch to a write-through cache policy so that the on-disk copy of all data stored in the write cache is up-to-date when each write operation is acknowledged to the host. Alternatively, the array controller may perform write cache mirroring via an alternative communication link to its partner array controller. Normal memory-to-memory interconnect based mirroring may be resumed after the memory-to-memory interconnect 18 has been reset and/or verified.

In embodiments where firmware 70 retries an I/O operation in response to a mirroring failure (e.g., as indicated by failure of the semaphore write to complete), firmware 70 may reinitiate the entire I/O operation if the firmware 70 cannot identify which individual request to the memory controller caused the semaphore write to fail. For example, since each bus 66 transaction is treated as an independent mirroring operation over the memory-to-memory interconnect 18, the memory controller 14A may report mirroring errors for a particular bus 66 transfer. However, the memory controller 14A may lack the proper context to associate a given bus 66 transfer with a particular I/O operation. The firmware 70 may also lack the context to retry the individual bus transaction at that granularity, and the firmware may not be able to associate the error with a given I/O (e.g., in embodiments where an array controller 10 may handle multiple queued write requests and those write requests may be multiplexed over the internal bus 66). If a semaphore write fails, the failure indicates that one or more errors have occurred since the last semaphore write competed. The error(s) may belong to any of the outstanding (i.e., unacknowledged) I/O operations initiated after the previous semaphore write. Accordingly, if more than one I/O operation is outstanding, more than one outstanding I/O operation may be reinitiated. In order to provide improved error resolution, an array controller 10 may include other mechanisms such as logging and/or journaling mechanisms in some embodiments.

In some embodiments, the firmware 70 may adjust the granularity on which write cache mirroring is verified. For example, if current resource usage is low, the firmware 70 may insert more than one semaphore write during a single host-initiated I/O operation. Then, if a semaphore write fails to complete, a smaller portion of the I/O may be retried than if a single semaphore write was used to verify the entire I/O operation. Thus, by providing a hardware-based verification technique and allowing firmware to dynamically vary the frequency of verification, firmware 70 may dynamically adjust the overhead used when verifying write cache mirroring.

Note that in some embodiments, the memory controller 14A may be configured to report any transmission errors on memory-to-memory interconnect 18 to firmware 70 (e.g., instead of retrying the transmission). For example, in order to provide increased performance at a lower implementation cost, the memory controller 14A may be configured to deallocate any buffer space allocated to the temporary storage of data sent over the memory-to-memory interconnect 18 prior to receiving transmission acknowledgment from memory controller 14B. As such, memory controller 14A may not be able to retry transfers if an error occurs. Note that in other embodiments, memory controller 14A may be configured to automatically retry transfers at least once before reporting an error. Note also that the firmware may lack the ability to explicitly transfer cached data over the memory-to-memory interconnect 18. In other words, transfers on the memory-to-memory interconnect 18 may only be initiated by a memory controller 14 in many embodiments.

Figure 7:
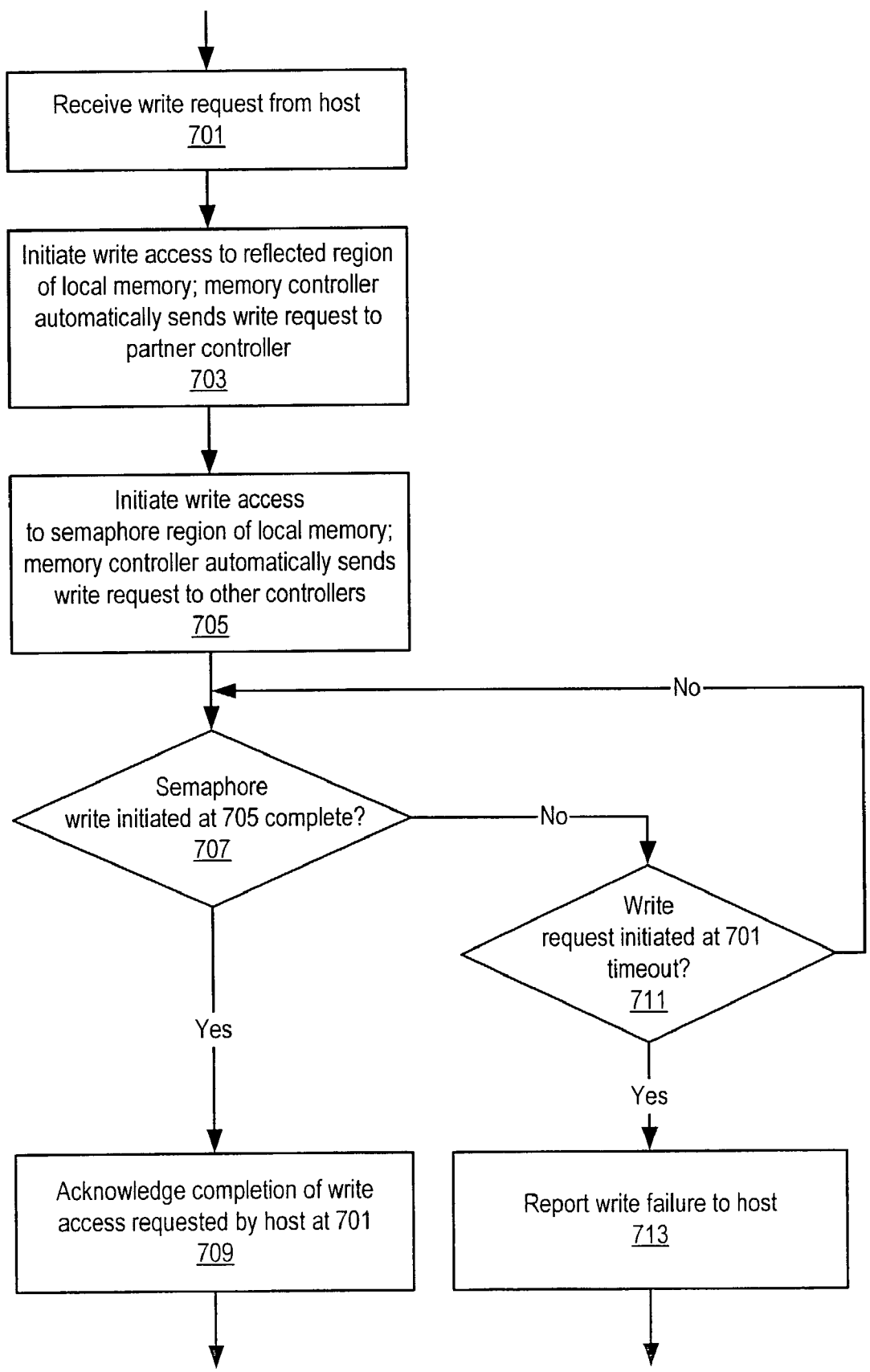
FIG. 7 is a flowchart of one embodiment of method for mirroring write caches.

FIG. 7 illustrates one embodiment of a method an array controller may implement to perform verified write cache mirroring. At 701, a write request is received from a host computer system. The write request may specify several blocks of user data. The array controller may return a message to the host indicating that it is ready to receive data (e.g., by initiating a series of one or more DMA transfers to transfer the data from the host to the array controller). At 703, a corresponding write request may be initiated to a reflected region of local memory. When the local memory controller sees the write to the reflected region, the local memory may automatically transfer the write request to a partner memory controller. The partner memory controller may responsively perform the write access to a partner-reflected region of the partner node's local memory. The transfer between memory controllers may take place over a dedicated memory-to-memory interconnect, independent of processing device intervention. Thus, the transfer may take place on a different communication medium than the one on which data is received from the host computer system or the one on which data is sent to the storage array. Note that action 703 may be performed several times for each host write request in some embodiments.

After one or more write accesses to the reflected region of local memory have been initiated at 703, write access to the semaphore region of local memory may be initiated (e.g., by a local processing device), as shown at 705. In one embodiment, one semaphore region write access may be initiated after multiple reflected region write accesses. In other embodiments, one semaphore region write access may be initiated after each reflected region write access. In response to initiation of the semaphore write access, the local memory controller may forward the semaphore write request to one or more remote memory controllers. The local memory controller may delay completing the local semaphore write access until all remote memory controllers have completed the semaphore write access. Furthermore, each memory controller, both local and remote, may not reorder the semaphore write access before completion of any reflected or partner-reflected region write accesses requested prior to the semaphore write request. Thus, completion of the local semaphore write access occurs after remote completion of the semaphore write access, which in turn occurs after remote completion of the partner-reflected region write access (or accesses) initiated at 703.

If the semaphore write initiated at 705 completes, the write access requested by the host at 701 may be acknowledged, as shown at 707–709. In many embodiments, a processing device may determine that the semaphore write initiated at 705 has completed by reading the address targeted by the semaphore write. If performance of the read indicates that the semaphore write has not completed, the local read may be retried. If the write fails to complete within a timeout period, as indicated at 711, an error may be returned to the host, as indicated at 713. Alternatively, instead of returning an error to the host, the local write cache (e.g., all valid data in the reflected region of the local memory) may be flushed to disk upon detection of an error. As another alternative, the initial write access requested at 701 may be retried. In such an embodiment, a subsequent failure may cause an error to be reported to the host.

Writes to the semaphore region are "verified" in that local completion of a semaphore write indicates that the semaphore write has completed remotely. By requesting a semaphore write after requesting a write to a non-verified region such as the reflected or metadata regions and by preventing requests from being reordered, a write to a non-verified region may be verified. In some embodiments, the firmware may be configured to dynamically switch between performing verified and unverified writes. For example, writes to certain storage devices (as identified by different LUNs in some embodiments) may be verified while others are not. In some embodiments, a user may be allowed to switch between verified and unverified writes (e.g., by updating a flag in a control register that controls the operation of the array controller firmware). Firmware may also dynamically switch between the verified and unverified writes in response to current load in some embodiments.

Note that in some embodiments, the semaphore write initiated at 705 may not be used for any purpose other than verifying the cache mirroring. In other embodiments, such a semaphore write may perform a specific function in addition to verifying the cache mirroring. For example, if firmware updates coherence information (as described in more detail below) stored in metadata region 26 in response to the write access to the reflected region, firmware may first acquire a lock on the metadata associated with the data written to the reflected region by writing to a particular location in the semaphore region. The firmware may then initiate a write to the metadata region and another write to the semaphore region to release the lock. The firmware may acknowledge the cache mirroring upon completion of the second semaphore write. In some embodiments, the semaphore region itself may be used to store control information, and thus the semaphore write may update control information. For example, in embodiments that include two array controllers in which one array controller acts as the master and the other acts as a passive backup (i.e., an active-passive configuration), the semaphore region may be used to store control information for the two array controllers. Accordingly, the semaphore write used to verify write cache mirroring may store appropriate control information in the semaphore region associated with the address written in the write cache. Note that in such embodiments, the memory mapping may not include a dedicated metadata region, and each array controller's memory may include one, but not necessarily both, of a reflected region and a partner-reflected region.

In contrast to when handling user data (when performance may take priority over having a fine granularity of control over errors), firmware may choose to verify every memory write when transferring metadata by generating a semaphore write request after each individual data transfer over the internal bus 66. Verifying each metadata write may increase write latency in order to allow each metadata write to be individually recovered in the event of a mirroring failure. Metadata writes may be verified by writing to the semaphore region in order to release a lock acquired on the metadata region prior to writing to the metadata region.

If an array controller 10A fails prior to completion of both the metadata mirroring and the user data mirroring in response to a particular I/O operation, a partner array controller 10B may detect the inconsistency between the metadata and the data in its partner-reflected region of memory 16B when the partner array controller 10B takes over. If the array controller 10A did not acknowledge the I/O operation before the failure, this inconsistency may be permitted. The array controllers 10 may be configured to prevent the user data and associated metadata for an acknowledged host I/O operation from being inconsistent with each other. In some embodiments, the array controllers 10 may be configured to guarantee that the metadata and the user data are up-to-date and consistent with one another for every acknowledged host write access. This guarantee may be provided by verifying unreliable writes to the reflected and metadata regions with verifiable writes to the semaphore region. For example, the array controller 10A may be configured to not acknowledge a host I/O operation until performance of both the user data mirroring and the metadata mirroring is verified by at least one subsequent semaphore write. Note that in some embodiments, the semaphore region may be used to store metadata, and thus the same semaphore write access used to perform the metadata mirroring may also verify the metadata mirroring and prior user data mirroring.

Synchronized Access to Shared Resources

Figure 8:
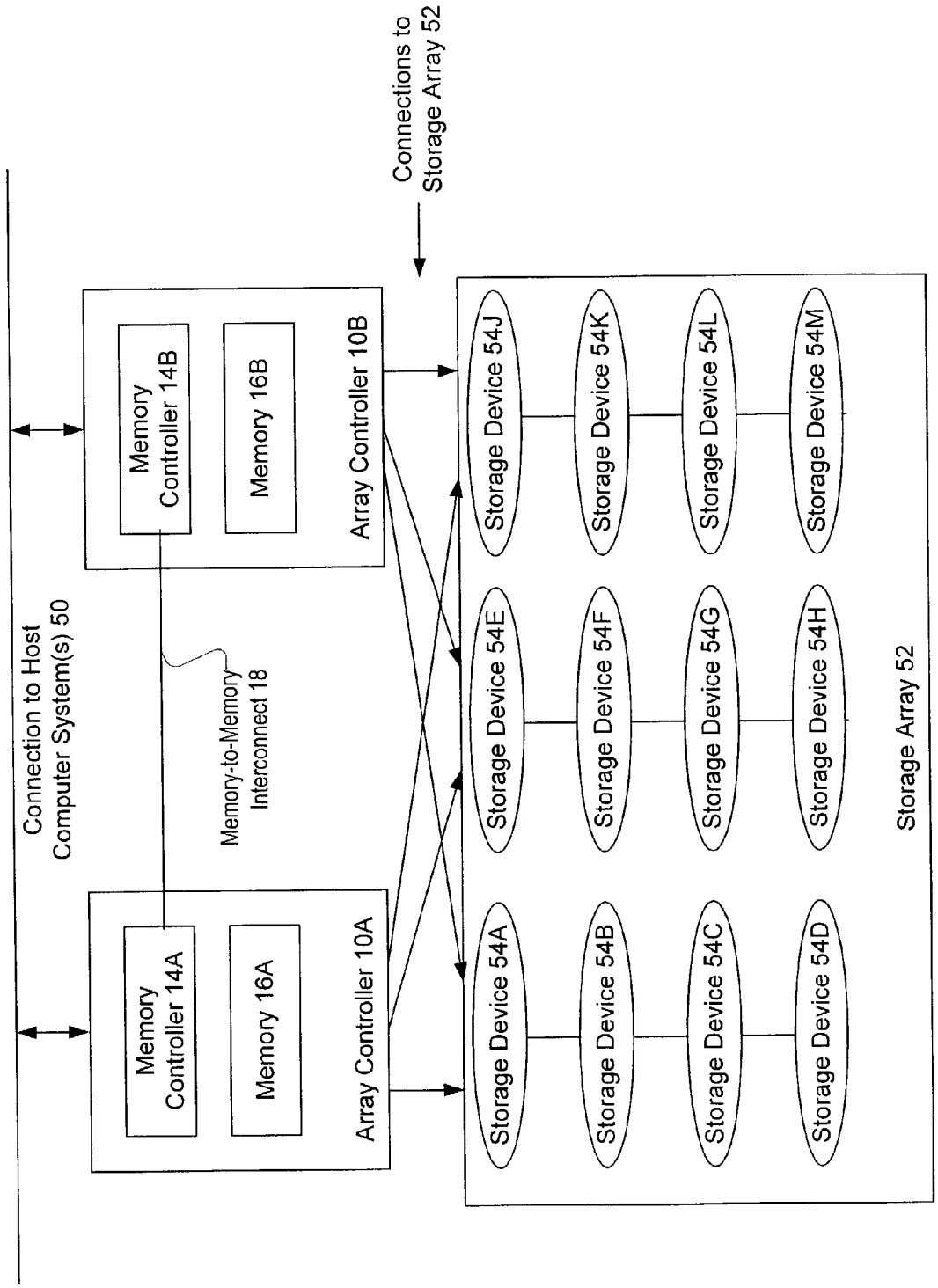
FIG. 8 is a block diagram of another embodiment of a storage system.

FIG. 8 shows a block diagram of an exemplary storage system that may include array controllers 10A and 10B. FIG. 8 illustrates a symmetric, active-active storage system in which two array controllers 10A and 10B have equal access to all of the storage devices 54A–54M in storage array 52. Thus, instead of one array controller 10A having primary access to the storage devices 54A–54M and the other array controller 10B operating as a backup, both may concurrently access each device in the storage array. The array controllers 10A and 10B may, in some embodiments, be configured to coordinate access to storage array 52 such that read and/or write access loads are roughly balanced between them. Array controllers 10A and 10B may be configured to synchronize access to storage devices 54 via writes to the semaphore region so that data integrity is preserved (e.g., so that one array controller 10A doesn't read data at the same time as that data is being updated by the other array controller 10B, which could result in array controller 10A returning potentially erroneous data to a host computer system). In alternative embodiments, the array controllers 10 may be organized in an asymmetric system in which each array controller is the primary controller of a particular subset of the storage devices 54. In such an embodiment, storage device ownership information (i.e., identifying which array controller(s) are exclusively responsible for handling host requests targeting particular storage devices 54) may be shared via the metadata region.

In systems that include two or more nodes 10 that share access to various resources such as storage devices 54, it may be desirable to enforce synchronization between nodes such that shared resources are accessed in a deterministic fashion. The semaphore region may be used as a locking mechanism for access to shared resources. Before one node 10A can modify a shared resource (e.g., metadata in a shared metadata region of memory or user data stored in storage array 52), that node 10A may be configured to acquire a lock for that resource by writing to the semaphore region. If another node 10B currently holds a lock on that resource, as indicated by a value stored in the semaphore region, the node 10A may wait to access the resource until the resource is released by the other node 10B. The value that indicates whether a node is requesting or has a lock on a particular resource may vary among embodiments. For example, in one embodiment, any non-zero value may indicate that a lock is held or being requested by a node. Resetting the value to zero may release the lock. In other embodiments, each node may write its node ID to the semaphore region to indicate that it is requesting a lock on an associated shared resource.

One example of a shared resource is the data stored on storage devices 54. Each array controller 10 may be configured to synchronize access to data stored on storage devices 54 by using the semaphore region as a locking mechanism. For example, in one embodiment, each block of data on storage devices 54 may have an associated semaphore lock. When an array controller 10A reads or writes a block of data on storage devices 54, the array controller 10A may first read each subregion within an associated portion of the semaphore region to determine whether another array controller 10B already has a lock on that block of data. If not, array controller 10A may acquire a lock on that block of data by writing to the locally writeable subregion (e.g., a bit or byte) within the associated portion of the semaphore region. Once the array controller 10A has acquired a lock by updating its locally writeable subregion of the associated semaphore region and verifying that no other array controller 10B has acquired or is requesting a lock on that data block, the array controller 10A may perform the requested access. Since the portion of the semaphore region associated with the data block may be relatively small (e.g., N bytes, where N is the number of array controllers) and semaphore writes are broadcast automatically by the memory controller hardware, acquiring a lock via the semaphore region may take little time relative to the amount of time required to perform the desired access to the storage device 54.

Another example of a shared resource is information stored in the metadata region. For example, information (e.g., base and bound values) identifying the size of each memory region may be stored in the metadata region. One array controller 10A may dynamically modify the base address and bound address for a shared memory region (e.g., for that array controller's reflected region) by modifying data stored in the metadata region. That array controller's memory controller 14A automatically broadcasts the modification via the memory-to-memory interconnect 18. In response to the modification being propagated to the remote array controllers, the remote array controllers may perform the metadata update, correspondingly increasing the size of their shared memory regions (e.g., by increasing the size of their partner-reflected regions if the local array controller increased the size of its reflected region). Before updating the metadata region, however, the array controller 10A may be configured to acquire a lock on the metadata region via the semaphore region.

Figure 9:
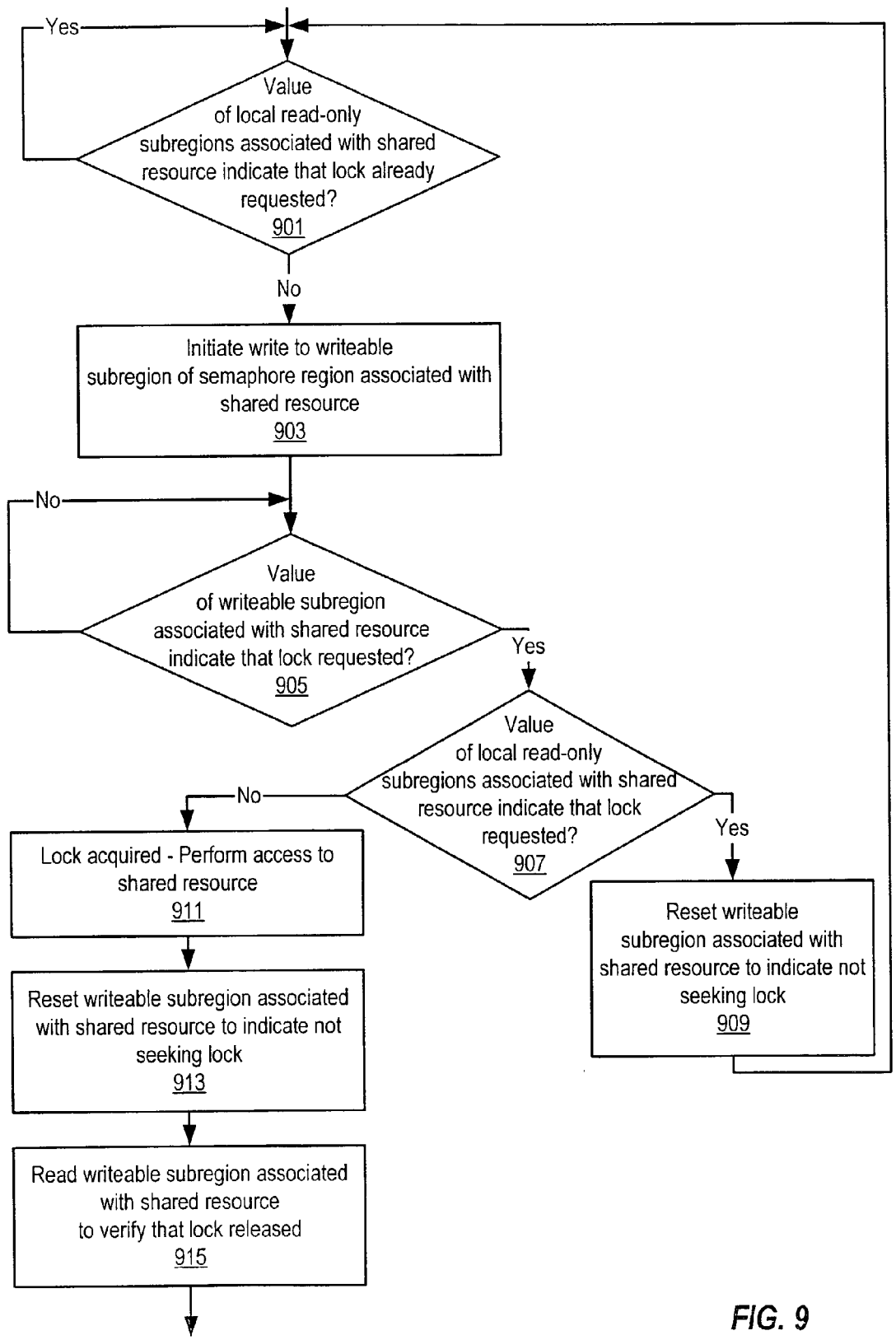
FIG. 9 illustrates one embodiment of a method of synchronizing access to shared resources.

FIG. 9 shows one embodiment of a method of performing a write to a semaphore region associated with a shared resource (e.g., the semaphore region may be associated with shared control data in metadata region or a block of data on a storage device 54) in order to gain a lock on the shared resource. The semaphore region associated with the shared resource includes N subregions (e.g., bits or bytes), where each subregion is writeable by a different one of N array controllers. Each array controller may read all of the subregions but may only write to a single subregion. Writes to the other subregions may be initiated by remote array controllers. The value of each subregion indicates whether the array controller with which that subregion is associated currently has or is seeking a lock on the shared resource. For example, if a single subregion has a non-zero value, the array controller associated with that subregion has acquired a lock on the shared resource. Note that similar semaphore regions may exist for other shared resources (e.g., respective portions of the semaphore region may be associated with each of several metadata addresses). Note that different portions of the overall mapped semaphore region (e.g., identified by a single base and bound address pair) may be associated with different shared resources. Each portion of the semaphore region associated with a particular shared resource may include N subregions, each associated with a respective array controller. In alternative embodiments, some shared resources may have distinct semaphore regions (e.g., each with its own base and/or bound address register).

In response to receiving a write request targeting a locally writeable subregion of a semaphore region, a local memory controller propagates the write to remote locations first by sending the write request to all other memory controllers via the memory-to-memory interconnect. In response to receiving indication(s) that each remote memory controller has completed the semaphore write, the local memory controller updates the semaphore subregion locally. Therefore, as soon as certain component(s) within an array controller receive an indication of completion of the write in the associated semaphore subregion, remote copies of the same subregion are ensured to be up to date. The memory controller hardware mechanism thereby guarantees the atomicity of each semaphore write.

In FIG. 9, the values of each of the locally read-only subregions associated with the shared resource are read to determine whether any other array controllers have already requested a lock on the shared resource, as indicated at 901. If another array controller has requested the lock, the local array controller may reread the subregions at a later time to see if the lock has been released. In some embodiments, the array controller may timeout the attempt to gain the lock if the lock is not released within a timeout period.

If none of the other array controllers have currently locked the shared resource as indicated by the values of the locally read-only subregions, the array controller may initiate a write to the writeable subregion of the semaphore region, as shown at 903. Since semaphore writes are ordered, the write initiated at 903 will not complete locally until the write has been performed in all remote array controllers' memories. Accordingly, the array controller may continue to read the semaphore region until the write initiated at 903 takes effect locally, indicating that the write has also completed in all remote locations. As mentioned above, if the local write does not take effect within a timeout period, the array controller may timeout the lock request.

After the write initiated at 903 is performed locally, the array controller may read the values of the other subregions of that semaphore region, as shown at 907. If any of the values indicate that another device is requesting access to the shared resource, the array controller may determine that it has lost the arbitration for the lock. Accordingly, the array controller may reset the locally writeable subregion to a value indicating that the array controller is no longer requesting the lock, as shown at 909. The array controller may retry the lock acquisition process at a later time. Note that other embodiments may handle competing requests for a lock differently.

If the values of the other subregions indicate that the array controller has gained the lock (i.e., the array controller's associated subregion is the only subregion with a value indicating that a lock is requested), the array controller may perform the desired access to the shared resource, as shown at 911. Upon completing the desired access, the array controller may reset the locally writeable subregion to a value indicating that the array controller has relinquished the lock, as indicated at 913. At 915, the array controller may read the local writeable subregion in order to verify that the local write completed, releasing the lock.

Note that each node's firmware may not be allowed to explicitly cache (i.e., in a high speed cache memory (not shown) coupled to processing device 12) control, status, and lock data stored in the semaphore and/or metadata region. Consequentially, any changes made by another node and reflected by that node's memory controller will be seen by local firmware the next time the firmware accesses the changed control data.

Cache Coherency

As mentioned above, array controllers 10 that share memory via the memory mappings shown in FIG. 2 may support concurrent access to the same storage devices 54. In such embodiments, each array controller may cache copies of recently accessed blocks of user data (e.g., modified copies may be cached in an array controller's reflected region of memory). Because several array controllers' write caches may include a modified copy of a particular block of user data, each array controller may be configured to maintain cache coherence between multiple possible cached copies of each block as well as any copies of each block stored on storage devices 54. In order to avoid responding to a host read access request with stale data (e.g., the copy of the requested data on disk may be stale with respect to a copy maintained in another controller's write cache), each array controller 10 may participate in a cache coherence scheme. A cache coherence scheme may provide enough information about the state of each cacheable address that the view of each address through any array controller's cache is the same as the view through another array controller's cache.

In one embodiment, the array controllers 10 may participate in a cache coherence scheme by each storing in a shared memory region coherence information that indicates the coherence state of a locally stored block of user data. Because the coherence information is shared via a shared memory region (e.g., the semaphore or metadata region), when one array controller updates the coherency state of a block, this update is automatically propagated by that array controller's memory controller and the memory-to-memory interconnect 18 to all other array controllers' memories. In one embodiment, firmware executing on each array controller may be configured to update the coherence information by writing to the shared memory region in response to each host I/O access that modifies the coherence information. If the coherence information is stored in metadata region 26, firmware may first acquire a lock on the appropriate metadata via the semaphore region 20. Note that while the coherency scheme is described herein in terms of blocks of user data, coherence states may be independently defined for other units of data (e.g., bytes, words) in other embodiments.

Figure 10:
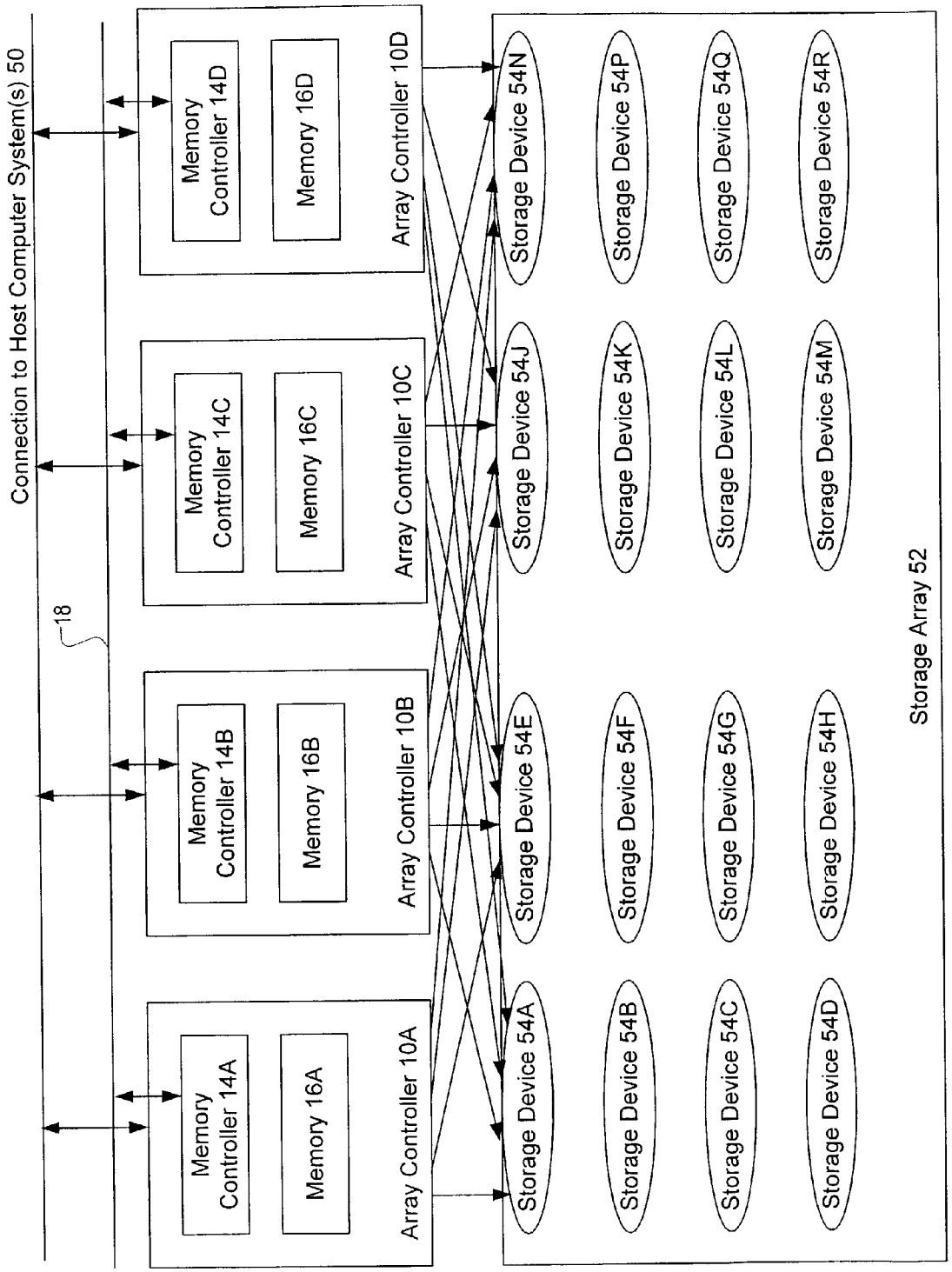
FIG. 10 is a block diagram of yet another embodiment of a storage system.

FIG. 10 illustrates another exemplary storage system that may include array controllers 10 that implement a memory mapping similar to that shown in FIG. 2. In FIG. 10, two pairs of array controllers are configured to access storage array 52. Each array controller may access any storage device 54 within storage array 52. Array controllers 10 are grouped into two pairs in order to provide write cache mirroring. In this example, array controllers 10A and 10B form one pair and array controllers 10C and 10D form another pair.

Since each array controller 10 may access all storage devices 54, each array controller 10 may, at any given time, store a cached copy of data for a given storage array address. When each array controller 10 receives a host access request for data in storage array 52, each array controller 10 may use coherency information stored in a shared memory region (e.g., the metadata region) to determine whether any other array controller 10 has a more up-to-date copy of the requested data or if cached copies of the requested data should be updated in response to the request.

In one embodiment, firmware 70 executing on a processing device 12 included in each array controller may manage implementation of the cache coherence scheme. The firmware may also maintain synchronization between memory accesses to the same storage array address initiated by different array controllers. The array controller firmware may use the memory mapping information to identify access requests that may require synchronization and/or coherency information (e.g., host access requests targeting blocks of data stored on storage devices 54). The array controller firmware may use the metadata and/or semaphore regions to store coherency information. For example, firmware 70 executing on a processing device 12 may access shared control data stored in metadata region 26 of a local memory 16 to determine whether any nodes currently have a valid copy of a particular block of user data. If a host computer sends a read request for block A to array controller 10A, firmware may generate a read request to access a portion of metadata region 26 in order to determine which nodes, if any, currently have a valid copy of that block cached in memory 16. The firmware may also update coherency information in response to performing certain types of accesses to certain mapped memory regions.

Details of the cache coherence scheme may vary among embodiments and among the different shared memory regions. For example, in one embodiment, if independent host I/O threads are not distributed across multiple array controllers, and if each thread exhibits temporal and spatial locality, a write-invalidation cache coherence protocol may be more efficient for user data than a write-update cache coherence protocol. In that same embodiment, however, a write-update cache coherence protocol may be implemented for metadata.

FIG. 11 is a table illustrating cache coherency states that may be implemented in one embodiment that implements a write-invalidate coherence protocol. At any given time in a symmetric storage array, an individual block of user data may be cached in one or more array controllers in at least one of the following states: mirrored, shared-clean, shared-dirty, and invalid. Different array controllers may have cached copies in different states.

When a block is in the mirrored state, exactly one pair of array controllers have the block cached and an on-disk copy of that block on a storage device 54 is out of date. In the invalid state, the block is out of date in an array controller. Note that a block may be invalid in one array controller and in a valid state (mirrored, shared-clean, or shared-dirty) in one or more other array controllers. In the shared-clean state, one or more array controllers have the block cached, and the on-disk copy is up to date. When a block is in the shared-dirty state, three or more controllers have the block cached, and the on-disk copy is out of date.

Figure 12:
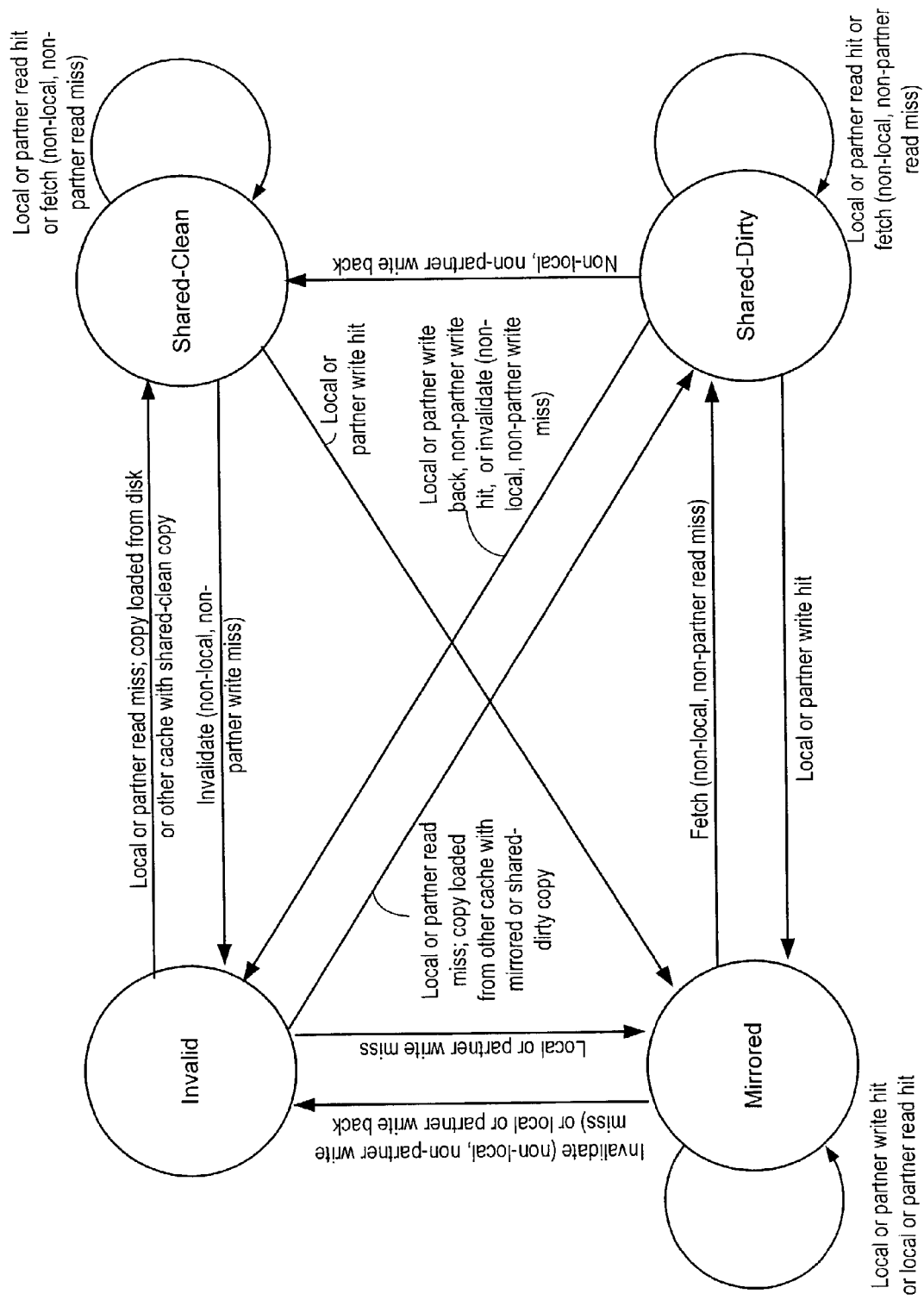
FIG. 12 illustrates cache coherency state transitions that may be implemented in some embodiments.

FIG. 12 illustrates how coherence states may transition for an individual block of user data in an array controller cache in response to various types of actions (e.g., fetches, read misses, read hits, etc.) being performed on that block by one or more array controllers. Firmware executing on an acting array controller may update the coherence state information in the metadata region associated with that block of user data in response to performing the action.

When the block is in an invalid state for a particular array controller, the current value of that block is either stored on disk or cached by one or more other non-partner array controllers. When an array controller or its partner array controller receives a read request from a host, the array controller may read the metadata associated with a targeted block of user data to determine that the copy of the corresponding block in its cache is invalid, indicating that a read miss has occurred. The array controller also reads the coherency information (e.g., from the metadata region) to determine whether a valid block is present in other array controller's cache. If so, the array controller may fetch the valid data from another array controller's cache (e.g., over the interconnect coupling the array controllers to the host) and update the state of the block in its cache to shared-dirty or shared-clean, depending on the state of the block in the other cache. Otherwise, the array controller may read the block from disk and update the state of the block to shared-clean.

When a write request from the host is received, resulting in a write miss for an invalid block, an array controller may write the new value of the block into its write cache, which is implemented in the reflected region of that array controller's memory. Accordingly, the memory controller included in that array controller may automatically mirror the block into the partner reflected region of the array controller's partner. As a result of the write access, the array controller and its partner have the block in the mirrored state and own the only valid copy of the block. Therefore, the array controller may update the coherence information in order to update the state of the cache block in its cache to be mirrored and to invalidate all cache and disk blocks that previously were in a mirrored, shared-clean, or shared-dirty state. When the cache block is in the invalid state, read and write hits cannot occur. Furthermore, actions performed by other non-partner array controllers may not have any effect on cache blocks in the invalid state.

When the block is in the mirrored state, the current value of the block is held in the write caches (i.e., in the reflected and partner-reflected regions) of the array controller and its partner. In response to a read hit (either in the array controller's write cache or the partner array controller's write cache), the array controller may return a copy of the requested data to the requesting host and the state of the cache block may remain mirrored. In response to a write hit (either in the array controller's write cache or the partner array controller's write cache), one of the array controllers may update its copy of the data block (i.e., by one array controller writing the updated value to its reflected region and the array controller hardware automatically mirroring that write to the partner array controller) and the state of the cache block remains mirrored. If the array controller or its partner performs a write back for the mirrored cache block, the array controller (or its partner) may update the coherence information to indicate that the block state is now invalid and the on-disk copy is up to date. A write back may occur when the array controller is flushing one or more user data blocks from the write cache to disk. If a write miss occurs in another non-partner array controller's write cache, the array controller and its partner array controller may invalidate their copies of the specified cache block. A mirrored block may be fetched during a read miss to an invalid block in another non-partner array controller's write cache. The state of the block may transition from mirrored to shared-dirty in response to such a fetch.

When a block is in the shared-clean state in the array controller's cache (e.g., in a read cache in a non-shared memory region), read misses, write misses, and write backs cannot occur to that block within the array controller's cache. In response to a read hit, the array controller returns the requested data to the host and the state of the block remains shared-clean. In response to a local write hit, the array controller writes the updated value of the block to its reflected region, causing the value to be automatically mirrored to its partner controller's write cache via the memory-to-memory interconnect, and the array controller and partner array controller update the state of this block to mirrored. Additionally, in response to the local (or a partner) write hit, remote copies of the block in any other caches are invalidated. A shared-clean block may be invalidated as the result of a write miss to an invalid cache block on another non-partner array controller. A shared-clean block may also be invalidated when a write hit occurs on another non-partner array controller that shares the block. A shared-clean block may be fetched during a read miss to an invalid block on another non-partner array controller. The local state of the block remains shared-clean after the fetch.

When the block is in the shared-dirty state, read misses and write misses cannot occur locally. In response to a local read hit for a shared-dirty block, an array controller returns a copy of the block to the requesting host and the state of the block remains shared-dirty. In response to a local write hit, an array controller may write the updated block value to its write cache, automatically mirroring the updated value to its partner controller's write cache, and update the state of the block to mirrored. The local write hit invalidates any other copies of this block. A shared-dirty block may be invalidated as the result of a write miss to an invalid cache block on another non-partner array controller. A shared-dirty block may be invalidated if an array controller's partner array controller de-stages the block to disk during a write back. A shared-dirty block may also be invalidated when a non-partner array controller receives a write hit. A shared-dirty block may be fetched during a read miss to an invalid block in another array controller. The state of the block remains shared-dirty after the fetch. When an array controller's partner array controller receives a write hit, the local state of the block transitions from share dirty to mirrored. If a non-partner array controller performs a write back for a locally shared-dirty block, the local array controller may update the coherency state for that block to shared-clean since, due to the write back, the on-disk copy of that block is now up to date.

Thus, the coherence information stored in a shared memory region may track the state of every block that is cached by an array controller. The coherence information for each block is referred to herein as a coherence information entry. Each coherence information entry may indicate which cache(s) have copies of an associated block and whether those copies are modified (i.e., "dirty"). In addition to tracking the state of each cacheable block, the coherence information may track which array controllers have copies of the block when the block is mirrored or shared, since those array controllers' copies will have to be invalidated if the block is written. Each coherence information entry may be stored in a metadata region of shared memory. Access to each coherence information entry may be gained by acquiring a lock (e.g., by writing to an associated semaphore region, as described above).

FIG. 13 illustrates the fields that may be included in an exemplary fully-mapped coherence information entry 1300A for a particular block of user data. In this embodiment, each coherence information entry includes a LUN ID 1301 identifying the particular storage device on which that block is stored, a LBA (Logical Block Address) 1303 identifying the block, the coherency state 1305 (e.g., mirrored, shared-clean, shared-dirty, or invalid) of the block, and the ID 1307 of the owning and/or sharing array controllers. An owning array controller has the block in a mirrored state. A sharing array controller has a copy of the block in a shared-clean or shared-dirty state.

In embodiments using coherence information entries 1300A, when an access request is received from a host, an array controller may directly look up whether the requested block is uncached (i.e., invalid in all array controller caches), mirrored, or in one of the shared states. Determining the coherency state of a block requires exactly one access to a metadata region associated with that block because one coherence information entry is present for each cacheable block. The amount of cache coherence information included in the metadata region is proportional to the product of the number of disk blocks and the number of array controllers. For example, if a storage array includes 2 array controllers, 14 drive slots, and 73.4 GB drives and assuming that the coherence data structure contains a coherence information entry for every 4 KB of disk data, the size the a fully-mapped coherence information structure is (2*14*73.4 GB)/(4 KB)=514 M entries. If each entry contains more than 64 bits, the coherency information occupies at least 4.11 GB in each controller.

Alternatively, the cache coherence information may scale more efficiently if it only includes information about blocks that are presently cached within at least one array controller. FIG. 14 illustrates the fields that may be included in a coherence information entry 1300B that records the state of an individual, physical cache block rather than that of a logical block (as shown in FIG. 13). As illustrated, coherence information entry 1300B may include fields identifying the cache block ID 1311 (e.g., formed from a controller ID and physical address), a tag 1313 identifying the data currently stored in that cache block (e.g., by LUN ID and LBA), the coherence state 1305 of the cache block, and the IDs 1307 of the owning and/or sharing array controllers. Since an entry is present for each cache block, the amount of coherence information is proportional to the product of the number of cache blocks per array controller and the number of array controllers.

In order to determine whether a block is cached in embodiments using coherence information entries 1300B, an array controller may first determine whether the requested block is present in its local cache, and if so, what coherency state the block is cached in, by reading a metadata region associated with that cache block. If the block is invalid locally, the array controller may check metadata regions associated with that block as stored within each of the other non-partner array controllers. The block is uncached if and only if the requested block is absent from all of the array controllers' caches. Thus, in embodiments implementing partially-mapped coherence information entries as shown in FIG. 14, an array controller may reference up to N entries (one for each array controller) of the coherence information structure in order to determine whether a block is cached.

Assuming a storage system that include 2 array controllers, which each include a 1 GB cache, and assuming that the coherence data structure contains an entry for every 4 KB cache block, the number of a partially-mapped coherence information entries is (2*1 GB)/(4 KB)=512 K entries. Assuming that each entry is 128 bits or 16 bytes, this structure consumes 8 MB or 0.8% of a 1 GB memory in each array controller.

In some embodiments, the relative size of the coherence information structure may be additionally reduced. According to the coherence protocol, mirrored data must reside in the write cache (i.e., the reflected region). In many embodiments, when the state of a cache block transitions from mirrored to shared-dirty (e.g., in response to a non-partner array controller performing a fetch as part of a read miss), the original copy of the cache block may remain in the array controller's write cache and the fetched copy may be written into an unmapped region of the non-partner array controller's memory. Therefore, in such embodiments, blocks of data in the unmapped region of memory are either shared-dirty, implying that a current copy may be found in another controller's write cache, or shared-clean or invalid, implying that a current copy may be found on disk. Therefore, as long as the coherence information entries for a block of user data include coherency information for every cache block in the reflected region of each array controller, each array controller is guaranteed to find at least one valid copy of the data, either on disk or cached in an array controller. If the reflected region is 512 MB, this implementation may decrease the coherence information structure size to 256K entries, occupying 0.4% of a 1 GB memory.

Note that a partially-mapped coherence information structure implementation assumes that an array controller addresses data in a remote array controller cache using the physical address of the data at the remote array controller. In a multi-controller embodiment, satisfying a read miss from a host may involve mapping the logical address of the request to a particular block identified in a list of blocks, since logically addressed data may not be physically contiguous. The list of blocks may include information that identifies the controller on which a particular block resides, as well as the physical address of the block on that controller. The list of blocks may also list the physical addresses for each controller that contains any part of the data. To fetch a block from another array controller's write cache, an array controller may use the list to directly address a remote cache using the block's physical address. Alternatively, the array controller may compute the logical address for the block and request the data from the remote controller using the logical address. The remote array controller may then perform the logical-to-physical translation and return the data. Alternatively, an array controller may include a DMA-like hardware engine that receives a physical list of blocks and automatically gathers all the remotely residing blocks included in the list.

Memory-to-Memory Interconnect Protocol

As shown in FIG. 2, each memory controller 14 may include an interface 30 that implements an interconnect protocol in order to facilitate data transfers over the memory-to-memory interconnect 18. The interconnect protocol defines a link layer that may be used in conjunction with any of various different physical layers. Accordingly, the interconnect may be implemented using various different transmission standards (e.g., LVDS (Low Voltage Differential Signaling), single-ended signaling, current mode signaling, voltage mode signaling, closed-loop timing, open-loop timing) and various different physical media (e.g., copper and optical cables). Note that while the interconnect protocol is described in a two memory controller embodiment, other embodiments may implement a similar interconnect protocol for use with more than two memory controllers.

Figure 15:
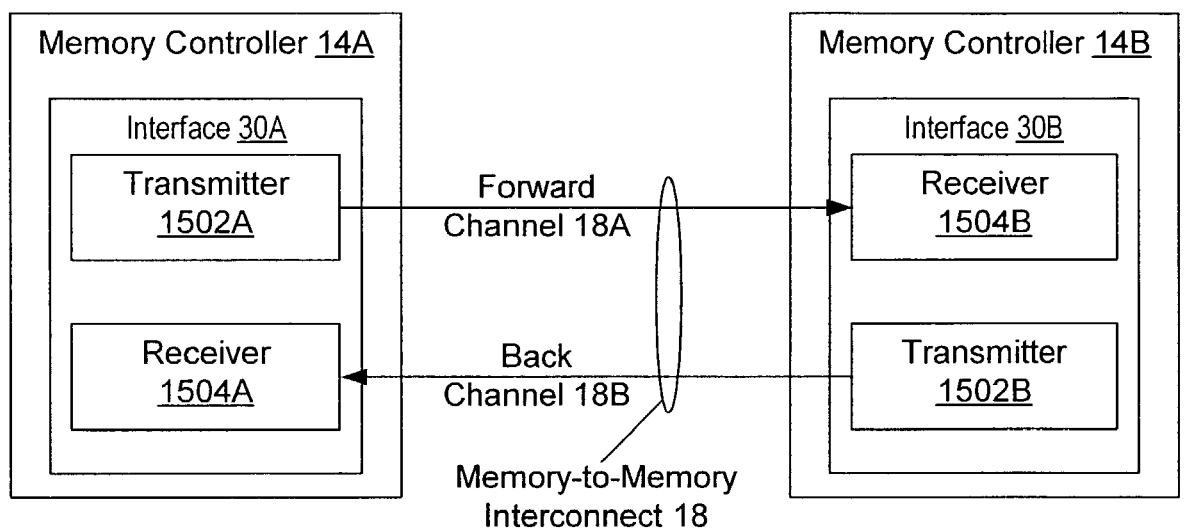
FIG. 15 illustrates a memory-to-memory interconnect according to one embodiment.
Figure 16:
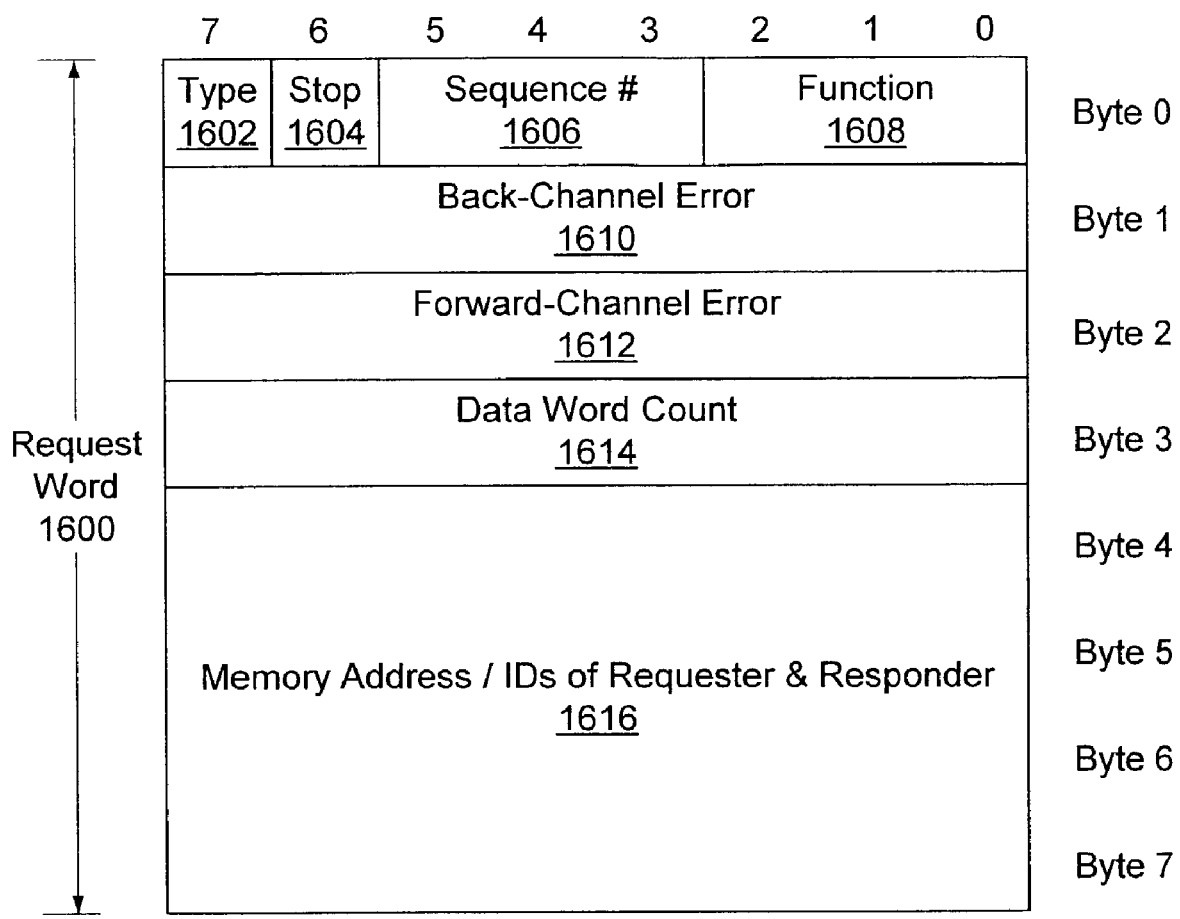
FIG. 16 illustrates an exemplary request word that may be included in messages communicated on a memory-to-memory interconnect in one embodiment.

FIGS. 15–16 illustrate details of an interconnect protocol according to one embodiment. FIG. 15 shows how the interconnect protocol may define two point-to-point unidirectional channels 18A and 18B within memory-to-memory interconnect 18 so that interconnect 18 provides a full-duplex link. The forward channel 18A carries communications from memory controller 14A to memory controller 14B. Similarly, the back channel 18B carries communications from memory controller 14B to memory controller 14A. These unidirectional channels are labeled from memory controller 14A's perspective. Accordingly, channel 18A is memory controller 14B's back channel and channel 18B is memory controller 14B's forward channel.

Each memory controller's interface 30 to the memory-to-memory interconnect 18 includes a transmitter 1502 and a receiver 1504. Each interface 30 may be configured to provide data protection via the use of error codes (e.g., error correcting and/or detecting codes) and/or counts of communications sent on the memory-to-memory interconnect. Error codes may provide protection against data corruption and communication counts and/or sequence numbers included in each communication may provide protection against transfer ordering errors. When an interface 30 detects a reception error on one channel, the interface 30 may report the error to the other memory controller's interface using the other channel, which transmits data in the opposite direction. Accordingly, each interface 30 may receive acknowledgments and/or error reports via its back channel.

The interface 30 included in each memory controller 14 may be configured to coordinate all memory-to-memory interconnect 18 communications involving that memory controller. For example, if a memory controller 14A receives local write requests via a PCI bus, the interface 30A may respond to each PCI write by generating an atomic unit of interconnect transfer called a message. Interface 30A may sequentially transmit one message at a time, without performing any reordering, in order to implement the ordering constraint described above. The interface 30A may be configured to not interleave the content of any message with the content of another message and to maintain the same relative order between messages as the order of the local writes that initiated each message. The interface 30 may also be configured to send and receive messages on the memory-to-memory interconnect at roughly the same rate at which local writes occur. Other embodiments may include local buses or interconnects other than PCI buses.

In one embodiment, interface 30 may be configured to send and receive four types of words via the memory-to-memory interconnect 18. The four types of words include request words, idle words, data words, and check words. A message may include request, data, and/or check words. Idle words, which carry interconnect control information in this embodiment, may be inserted between messages. A typical message may include a request word followed by a series of one or more data words. Every N sequentially transmitted words (request, control, idle, data), transmitter 1502 may insert a check word into the communication stream.

FIG. 16 illustrates an exemplary fixed-size, 8-byte request word 1600 that may be used in messages in one embodiment. Such a request word may be transmitted by an interface (e.g., interface 30A) in response to a local write (e.g., to broadcast the local write to another memory controller 14B) and prior to transferring the data involved in the local write. A request word 1600 may include command, address, flow control, status, and/or error information that allows the message of which that request word is a part to be delivered to and executed by a receiving memory controller 14B.

In one embodiment, a request word 1600 may include the fields shown in FIG. 16. These fields include: word type 1602; stop 1604; sequence number 1606; function 1608; back-channel error 1610; forward-channel error 1612; data word count 1614; and memory address, requester ID, and responder ID 1616. The word type field 1602, which may be a single bit in size, may be set to a particular value (e.g., zero) to identify a particular word as a request word. Other values of the word type field 1602 may identify certain other types of words (e.g., idle words). The stop field 1604, which may also be a single bit in size, may contain flow control information for the back channel 18B of the interface 30A transmitting the request word 1600. For example, when the stop field 1604 is reset to zero (Stop), that value of the stop field 1604 may instruct the other interface 30B to pause transmission at the next message boundary. When the stop field 1604 is set to one (Start), the value of the stop field instructs the other interface 30B to proceed with the transmission. Receiver buffers (e.g., FIFO buffers) included in each interface 30 may be adequately sized to avoid potential overflow due to flow control being asserted via the stop field 1604.

In one embodiment, the sequence number field 1606 may include an N-bit sequence number that increments with each message and each idle word. Each receiver 1504 may include a sequence number counter. The interface 30 may compare the sequence number field 1606 in a received word with the current value of the local sequence number counter in order to detect whether any interconnect errors have occurred (e.g., whether any control information has been missed due to a missed word).

The function field 1608 may include command information for a message. For example, a transmitter 1502A may set the function field 1608 to a particular value depending on the mapping of the local write that initiated the message. If the write address maps to the reflected region of the local memory 16A, for example, the transmitter 1502A may encode "write partner-reflected" into the function field 1608 of the request word. Similarly, if the write address maps to the semaphore region of the local memory 16A, the transmitter 1502A may encode "write semaphore" into the function field 1608. If the write address maps to the metadata region of the local memory 16A, the transmitter 1502A may encode "write metadata." Furthermore, in embodiments where completion of a remotely-initiated semaphore write is signaled by returning a message to the initiating memory controller 14B, the transmitter 1502A may be configured to encode "return semaphore" in the function field 1608 of a message sent in response to local completion of a remotely-initiated semaphore write. Receipt of the request word 1600 having a return semaphore value in the function field 1608 may cause the initiating memory controller 14B to complete a locally-initiated semaphore write. Another function field encoding may identify a poll command, which an interface 30A may send in order to verify the operational status of another interface 30B.

The back channel error field 1610 may include status and acknowledgment information associated with any messages received by a sending interface 30A since the last request word sent by that interface 30A. An interface 30A may receive several small messages via its back channel 18B while a long message is occupying the forward channel 18A with a long series of data words. Back channel error information may not be communicated on the forward channel 18A until either the next request word or the next idle word. In order to provide thorough error information in situations such as these, the back channel error field 1610 may include cumulative error information for multiple small messages. For example, the interface 30A may generate the value of the back channel error field 1610 by logically combining (e.g., via an OR operation) all outstanding errors. The forward channel error field 1612 similarly indicates any error conditions relating to the previous message transmitted by the sending interface 30A.

The word count field 1614 may indicate the number of data words transferred by the interface 30A sending the request word 1600 during the previous outgoing message. The memory address field 1616 may indicate the physical address of the local write that originated this memory-to-memory interconnect message. Each receiver 1504 may be configured to use local mapping information to map the address included in the memory address field 1616 to the corresponding local address within a local memory 16. Depending on the content of the function field 1608, an interface 30 may perform address mapping. For example, if the function field encoding is "write partner-reflected," the receiving interface may map the physical memory address into the partner-reflected region of the local memory. Similarly, if the function field encoding is "write metadata," the receiving interface may map the physical memory address into the metadata region. Note that if the function field encoding is "return semaphore," indicating the remote completion of a semaphore write initiated by the receiving interface, the receiving interface may use the address included in the request word without performing any memory mapping.

The Requester ID & Responder ID fields 1616 may be used when the function field 1608 identifies the current request word as a poll command. When an interface 30A generating this request word is starting the poll process, the interface 30A places its identifier in the Requester ID field and resets the Responder ID field to an invalid value (e.g., zero). When the receiving interface 30B receives the poll command, the receiving interface 30B checks the Requester ID to make sure that this was not a poll command the receiving interface 30B originated earlier. If the request message is not part of a poll command originated earlier by the receiving interface 30B, the receiving interface 30B inserts its identifier in the Responder ID field and resends the request word on the receiving interface's forward channel. The initiating interface 30A receives the resent request word, examines the Requester ID to make sure that this is not a new poll command initiated by the other interface 30B, and then checks the Responder ID to verify that both interfaces 30A and 30B are present on the link. Note that in some embodiments, field 1616 may include only requester ID and responder ID information in poll commands and only address information in the various write access commands.

Multiple fixed-size (e.g., 8-byte) data words may be transmitted during a message following transmission of the message's request word 1600. The number of data words included in a message is indicated by the data word count field 1614 included in a subsequently transmitted request word 1600 or idle word.

Idle words may be communicated over the memory-to-memory interconnect 18 when no request, check, and/or data words are being transmitted. Each 8-byte idle word may include the same interconnect control information that a request word 1600 carries. However, the word type field 1602 in an idle word may be set to a value (e.g., 1) indicating that the word is an idle word. The data word count field 1614 in an idle word may indicate the number of data words (if any) transferred by the sending interface during the previous outgoing message. The function field 1608 of an idle word may be set to an invalid value or have the same value as that of the previous request word.

Each interface 30 may, in some embodiments, send a check word over the memory-to-memory interconnect 18 every few (e.g., eight) words. For example, in one embodiment, an 8-byte check word may be formed by accumulating and concatenating individual 1-byte error codes that protect each of eight preceding words. The position of the check word within the communication stream may be identified during initialization of the memory-to-memory interconnect 18. After initialization, each receiver 1504 may maintain check word alignment by counting eight words to the next check word. In response to receiving a check word, a receiver 1504A may perform the appropriate validation. If there are any error code mismatches, the transmitter 1502A included in the same interface 30A may encode the error information in the back channel error field 1610 of the next request or idle word to be sent across the memory-to-memory interconnect. Additionally, the error may be reported to the node's firmware (e.g., via an interrupt cycle on a local PCI bus).

Idle words and request words may include a stop field 1604 used to implement a link-level, push-back flow control scheme. In some embodiments, a message may be the unit of flow control such that all interconnect 18 traffic starts and stops at message boundaries. In such embodiments, initiated messages (e.g., messages whose request word 1600 has been sent) may not be stopped mid-transmission. When a receiver 1504A senses that its receive buffers are almost fill, the receiver 1504A may inform its corresponding forward channel transmitter 1502A to reset the stop field 1604 of the next outgoing request word or idle word. The reset stop field 1694 is transmitted over the forward channel 18A and detected by the forward channel receiver 1504B at the other side. The forward channel receiver 1504B may then cause the back channel transmitter 1502B to pause transmission as soon as the currently transmitting message completes. The receive buffers in the back channel receiver 1504A may be sized so that the receive buffers can accommodate all incoming data before the back channel transmitter 1502B is able to stop outgoing traffic. The size of the receive buffers may be selected based on: sender overhead (e.g., time for transmitter 1502A to detect that receiver 1504A is requesting flow control); time to send a maximum size message (e.g., assuming transmitter 1502A had just starting sending a maximum size message when transmitter 1502A detected receiver 1504A's request for flow control); time for transmitter 1502A to communicate a request or idle word having a reset stop field 1604 to receiver 1504B; receiver overhead (e.g., time for receiver 1504B to detect that interface 30A is requesting flow control in response to receiving a word with a reset stop field); latency for receiver 1504B to communicate the flow control request to transmitter 1502B; time for transmitter 1502B to respond to a flow control request detected by receiver 1504B; time to send another maximum size message (e.g., assuming transmitter 1502B had just starting sending a maximum size message when transmitter 1502B detected receiver 1504A's request for flow control); any cable delays in both the forward and back channels; and the transmission rate of the forward and back channels.

FIG. 17 demonstrates how idle words and request words may be used to handshake the delivery of messages through the inclusion of forward and back channel error information in some embodiments. The top row illustrates what words are transferred from interface 30A to interface 30B, and the bottom row shows what words are transferred 30B to interface 30A. Time increases to the right. In this example, it is assumed that each interface 30 begins sending messages just after initialization of the memory-to-memory interconnect 18.

Initially, both interfaces 30A and 30B initiate messages with a request word (request word 1600A and request word 1600C respectively). The first message sent by interface 30A includes four data words 1700A1–A4. Interface 30A immediately begins sending a second message beginning with request word 1600B after sending the first message. Request word 1600A indicates no forward channel error information and a data word count of zero since it is the first message sent by interface 30A after initialization. The forward channel error information and the data word count for the message that includes request word 1600A is included in the appropriate fields in request word 1600B.

The first request word 1600C sent by interface 30B also includes no forward channel error information and a data word count of zero. Interface 30B finishes sending its first message, which includes request word 1600C and data words 1700C1–C2, before interface 30A finishes sending its first message. Interface 30B then sends four idle words 1750B–E. Interface 30B includes the forward channel error information and the data word count for its first message in the appropriate fields within idle word 1750B. Since interface 30B has not finished sending its first message when interface 30B sends idle word 1750B, idle word 1750B does not include any back channel error information for the message that includes request word 1600A. In other words, interface 30B is configured to not include any back channel error information in request and idle words sent prior to completion of the message including request word 1600A since interface 30B has not yet received a full message on its back channel.

When interface 30B has received all the data words 1700A1–A4 included in interface 30A's first message and verified the sequence numbers, error code information (if any), and/or word count (included in request word 1600B) for that message, interface 30B may include the appropriate back channel error information (e.g., indicating that no error was detected in the first message) in the next idle or request word it sends. In this example, interface 30B may include the back channel error information for the first message sent by interface 30A in idle word 1750E.

The second message sent by interface 30A, which includes request word 1600B, is a long message including many data words 1700B1–Bn. Accordingly, while interface 30A is sending its second message, interface 30A may receive several messages from interface 30B. In the illustrated example, interface 30B sends two messages (respectively including request words 1600D and 1600E) and begins sending a third message (including request word 1600F) before interface 30A finishes sending its second message. Accordingly, interface 30A may accumulate the back channel error information for the second and third messages sent by interface 30B and include this information in the next request or idle word sent by interface 30A after the second message. Thus, idle word 1750A includes the cumulative back channel error information for the second and third messages sent by interface 30B.

In one embodiment, the interconnect protocol may adhere to the following rules: (1) the word type, sequence number, memory address, and function for a message appear in the request word that initiates the message; (2) forward channel error information for a message appears in the first request or idle word immediately following that message; (3) the data word count for a message appears in the first request or idle word immediately following that message; (4) the data word count included in an idle or request word is zero if there is no previous message; (5) messages may not terminated early (i.e., if an error is encountered mid-transfer of a message, the transmitter waits until the next request or idle word to signal the error); (6) only request and idle words may carry flow control and error information; and (7) back channel error information for a particular message may not be precisely identified (i.e., back channel error information in any given idle or request word may include cumulative error information for several messages).

The interconnect protocol implemented by interfaces 30 may include an appropriate error protocol for use when an error condition is detected on the memory-to-memory interconnect 18. Each receiver 1504 may detect a transmission error by checking redundant information (such as a sequence number, data word count, and/or a check word) that accompanies a message or a word. In many embodiments, interfaces 30 may not be configured to handle transmission errors by correcting received messages and/or by retransmitting erroneous messages. Instead, each interface 30 may be configured to report any errors to local firmware (e.g., interface 30A may report errors to firmware 70 executing on processor 12A in array controller 10A by generating a PCI interrupt), remote firmware, or both. In some embodiments, an interface 30 may identify the memory address for the error, if the address is available. This may allow the array controller firmware to optimize error recovery by increasing the resolution of error handling. However, in many situations an interface 30 may not be able to reliably identify the memory address associated with an erroneous message since the address content itself may be corrupt.

While many of the above examples arise in the context of a storage system, note that many embodiments may be implemented in other contexts other than storage systems. For example, in one embodiment, a pair of bus bridges configured to perform buffered writes may implement mirrored write caches using memory mapping techniques similar to those described above. In other embodiments, network adapters may implement memory mapping techniques and memory-to-memory interconnect protocols similar to those described above in order to provide write cache mirroring and/or synchronized access to shared resources. Note also that the techniques described as being implemented by array controllers may also be implemented by other types of storage device controllers in some embodiments. For example, if two storage devices are configured as a mirrored pair, the storage device controllers of those two storage devices may implement write cache mirroring and other techniques using a memory mapping and memory-to-memory interconnect similar to that described above. In such embodiments, each storage device controller may be integrated in the same chassis as the storage device it controls.

Numerous variations and modifications will become apparent to those skilled in the art once the above disclosure is fully appreciated. It is intended that the following claims be interpreted to embrace all such variations and modifications.

What is claimed is:

1. A storage controller, comprising:
   a processing device;
   a memory controller coupled to the processing device; and
   a memory coupled to the memory controller;
   wherein the processing device is configured to send one or more write requests followed by a semaphore write request to the memory controller in response to receiving a host write request;
   wherein in response to receiving the one or more write requests from the processing device, the memory controller is configured to perform one or more responsive write accesses to a region of the memory and to forward the one or more write requests to an other memory controller;
   wherein in response to receiving the semaphore write request, the memory controller is configured to forward the semaphore write request to the other memory controller and to delay performance of a responsive write access to a semaphore region of the memory until the memory controller receives an indication that the other memory controller has completed the semaphore write request.

2. The storage controller of claim 1, wherein the processing device is configured to acknowledge performance of the host write request in response to completion of the write access to the semaphore region of the memory.

3. The storage controller of claim 1, wherein in response to receiving a forwarded write request from the other memory controller, the memory controller is configured to perform a responsive write access to an other region of the memory.

4. The storage controller of claim 1, wherein in response to receiving a second semaphore write request from the other memory controller, the memory controller is configured to perform a responsive write access to the semaphore region of the memory and, when the responsive write access to the semaphore region is complete, to send an indication that the memory controller has completed the second semaphore write request to the other memory controller.

5. The storage controller of claim 1, wherein the memory controller is configured to forward the semaphore write request to the other memory controller without intervention by the processing device.

6. The storage controller of claim 1, wherein the processing device is configured to timeout the semaphore request if the memory controller does not complete performance of the responsive write access to the semaphore region of the memory within a timeout period.

7. The storage controller of claim 6, wherein the processing device is configured to read the semaphore region in order to determine whether the memory controller has completed performance of the responsive write access to the semaphore region of the memory.

8. The storage controller of claim 6, wherein the processing device is configured to retry any outstanding host write requests in response to the semaphore request timing out;
   wherein outstanding host write requests are all host write requests for which an acknowledgement has not yet been generated by the processing device.

9. The storage controller of claim 6, wherein the processing device is configured to copy all data stored in the region of the memory to a storage device in response to the semaphore request timing out.

10. The storage controller of claim 6, wherein the processing device is configured to copy data written to the region of the memory by the write request to an other memory via a second interconnect in response to the semaphore request timing out.

11. The storage controller of claim 10, wherein the processing device is configured to send a plurality of write requests prior to sending the semaphore write request in response to receiving the host write request;
wherein the processing device is configured to copy data written to the region of the memory by the plurality of write requests to the other memory in response to the semaphore request timing out.

12. The storage controller of claim 1, wherein the performance of the responsive write access to the semaphore region of the memory updates coherence information associated with a block of data written to the region of the memory by the one or more responsive write accesses to the region of the memory.

13. The storage controller of claim 12, wherein the coherence information associated with the block of data includes a cache block ID identifying the address of the block of data within the region of the memory.

14. The storage controller of claim 12, wherein the coherence information associated with the block of data includes a LBA (Logical Block Address) identifying the block of data.

15. The storage controller of claim 12, wherein the processing device is configured to send write data with the semaphore write request, wherein the write data indicates that a coherence state of the block of data within the memory is mirrored, and wherein data currently stored in the semaphore region indicates that the coherence state of the block of data within the memory is invalid.

16. The storage controller of claim 1, wherein in response to performance of the responsive write access to the semaphore region of the memory, the processing device is configured to send to the memory controller a metadata write request and metadata indicating a new coherence state for a block of data written to the region of the memory by the one or more responsive write accesses to the region of the memory.

17. The storage controller of claim 16, wherein the memory controller is configured to write the metadata to a metadata region of the memory and to broadcast the metadata write request and the metadata to one or more other memory controllers in response to receiving the metadata write request.

18. The storage controller of claim 17, wherein the processing device is configured to send a second semaphore write request to the memory controller in order to reset a value of the semaphore region of the memory subsequent to sending the metadata write request.

19. The storage controller of claim 18, wherein in response to the memory controller completing the second semaphore write request, the processing device is configured to acknowledge the host write request.

20. The storage controller of claim 1, wherein the one or more responsive write accesses to the region of the memory update a block of data, and wherein the responsive write access to the semaphore region of the memory updates a byte of data.

21. The storage controller of claim 1, wherein the memory controller is configured to send write requests to the other memory controller in a same order in which the memory controller received the write requests from the processing device.

22. The storage controller of claim 1, wherein the processing device is configured to send a plurality of write requests to the memory controller prior to sending the semaphore write request to the memory controller;
wherein the processing device is configured to verify performance of the plurality of write requests by the other memory controller upon completion of the responsive write access to the semaphore region of the memory; and
wherein the processing device is configured to dynamically vary a number of write requests sent between successive semaphore write requests.

23. A system, comprising:
a host computer system configured to generate a host write request;
a node coupled to the host computer system and comprising a memory controller, a memory, and a processing device; and
a partner node comprising a partner memory controller and a partner memory, wherein the partner memory controller is coupled to the memory controller by an interconnect;
wherein the processing device is configured to send one or more write requests followed by a semaphore write request to the memory controller in response to the node receiving the host write request generated by the host computer system;
wherein in response to receiving the one or more write requests, the memory controller is configured to perform one or more write accesses to a region of the memory and to convey the one or more write requests to the partner memory controller via the interconnect;
wherein in response to receiving the semaphore write request, the memory controller is configured to convey the semaphore write request to the partner memory controller via the interconnect and to delay performing a write access to a semaphore region of the memory until the partner memory controller performs a write access to the partner memory in response to the semaphore write request.

24. The system of claim 23, wherein the processing device is configured to generate an acknowledgement of performance of the host write request in response to the memory controller performing the write access to the semaphore region of the memory.

25. The system of claim 23, wherein the partner memory controller is configured to convey an other write request to the memory controller in response to receiving a write request from a partner processing device included in the partner node.

26. The system of claim 25, wherein in response to receiving the other write request from the partner memory controller, the memory controller is configured to perform a responsive write access to an other region of the memory.

27. The system of claim 23, wherein in response to receiving a second semaphore write request from the partner memory controller, the memory controller is configured to perform a responsive write access to the semaphore region of the memory and, when the responsive write access to the semaphore region is complete, to send an indication that the memory controller has completed the second semaphore write request to the partner memory controller.

28. The system of claim 23, wherein the memory controller is configured to forward the semaphore write request to the partner memory controller without intervention by the processing device.

29. The system of claim 23, wherein the processing device is configured to timeout the semaphore write request if the memory controller does not complete performance of the responsive write access to the semaphore region of the memory within a timeout period.

30. The system of claim 29, wherein the processing device is configured to read the semaphore region in order to determine whether the memory controller has completed performance of the responsive write access to the semaphore region of the memory.

31. The system of claim 29, wherein the processing device is configured to retry any outstanding host write requests in response to the semaphore write request timing out;
wherein outstanding host write requests are all host write requests for which an acknowledgement has not yet been generated by the processing device.

32. The system of claim 29, wherein the processing device is configured to copy all data stored in the region of the memory to a storage device coupled to the node in response to the semaphore write request timing out.

33. The system of claim 29, wherein the processing device is configured to copy data written to the region of the memory by the write request to the partner memory via a second interconnect coupling the node to the partner node in response to the semaphore write request timing out.

34. The system of claim 33, wherein the second interconnect couples a storage array to the node and the partner node.

35. The system of claim 33, wherein the processing device is configured to send a plurality of write requests prior to sending the semaphore write request in response to receiving the host write request; and
wherein the processing device is configured to copy data written to the region of the memory by the plurality of write requests to the partner memory in response to the semaphore write request timing out.

36. The system of claim 23, wherein the performance of the responsive write access to the semaphore region of the memory updates coherence information associated with a block of data written to the region of the memory by the one or more responsive write accesses to the region of the memory.

37. The system of claim 36, wherein the coherence information associated with the block of data includes a cache block ID identifying the address of the block of data within the region of the memory.

38. The system of claim 36, wherein the coherence information associated with the block of data includes a LBA (Logical Block Address) identifying the block of data.

39. The system of claim 36, wherein the processing device is configured to send write data with the semaphore write request, wherein the write data indicates that a coherence state of the block of data within the memory is mirrored, and wherein data currently stored in the semaphore region indicates that the coherence state of the block of data within the memory is invalid.

40. The system of claim 23, wherein in response to performance of the responsive write access to the semaphore region of the memory, the processing device is configured to send to the memory controller a metadata write request and metadata indicating a new coherence state for a block of data written to the region of the memory by the one or more responsive write accesses to the region of the memory.

41. The system of claim 40, wherein the memory controller is configured to write the metadata to a metadata region of the memory and to broadcast the metadata write request and the metadata to one or more other memory controllers via the interconnect in response to receiving the metadata write request, wherein the partner memory controller is included in the one or more other memory controllers.

42. The system of claim 41, wherein the processing device is configured to send a second semaphore write request to the memory controller in order to reset a value of the semaphore region of the memory subsequent to sending the metadata write request.

43. The system of claim 42, wherein in response to the memory controller completing the second semaphore write request, the processing device is configured to acknowledge the host write request.

44. The system of claim 23, wherein the one or more responsive write accesses to the region of the memory update a block of data, and wherein the responsive write access to the semaphore region of the memory updates a byte of data.

45. The system of claim 23, wherein the memory controller is configured to send write requests to the partner memory controller in a same order in which the memory controller received the write requests from the processing device.

46. The system of claim 23, wherein the processing device is configured to send a plurality of write requests to the memory controller prior to sending the semaphore write request to the memory controller;
wherein the processing device is configured to verify performance of the plurality of write requests by the partner memory controller upon completion of the responsive write access to the semaphore region of the memory; and
wherein the processing device is configured to dynamically vary a number of write requests sent between successive semaphore write requests.

47. A method, comprising:
a storage controller receiving a host write request from a host computer system, wherein the storage controller includes a processing device, a memory controller, and a memory;
in response to said receiving, the processing device sending to the memory controller one or more write requests targeting a region of the memory followed by a semaphore write request targeting a semaphore region of the memory;
the memory controller forwarding the one or more write requests to a partner memory controller included in an other storage controller and broadcasting the semaphore write request to one or more other memory controllers including the partner memory controller;
the memory controller accessing the region of the memory in response to the one or more write requests prior to accessing the semaphore region of the memory in response to the semaphore write request;
the memory controller delaying accessing the semaphore region of the memory in response to the semaphore write request until each of the one or more other memory controllers complete an access to a respective other memory in response to the semaphore write request.

48. The method of claim 47, further comprising the processing device acknowledging the host write request in response to the memory controller accessing the semaphore region in response to the semaphore write request.

49. The method of claim 47, further comprising the memory controller performing a responsive write access to an other region of the memory in response to receiving a forwarded write request from the partner memory controller.

50. The method of claim 47, further comprising the memory controller forwarding the semaphore write request to the partner memory controller without intervention from the processing device.

51. The method of claim 47, further comprising the processing device timing out the semaphore write request if memory controller does not access the semaphore region of the memory in response to the semaphore write request within a timeout period.

52. The method of claim 51, further comprising the processing device reading the semaphore region in order to determine whether the memory controller has completed accessing the semaphore region of the memory in response to the semaphore write request.

53. The method of claim 51, further comprising the processing device retrying any outstanding host write requests in response to timing out the semaphore write request;
   wherein outstanding host write requests are all host write requests for which an acknowledgement has not yet been generated by the processing device.

54. The method of claim 51, further comprising the processing device copying data stored in the region of the memory to a storage device coupled to the storage controller in response to timing out the semaphore write request.

55. The method of claim 51, further comprising the processing device copying data written to the region of the memory by the one or more write requests to a partner memory include in the other storage controller in response to the semaphore write request timing out,
   wherein said copying comprises conveying the data via a different interconnect than is used during said forwarding the one or more write requests to a partner memory controller.

56. The method of claim 55, wherein the second interconnect couples a storage array to the storage controller and the other storage controller.

57. The method of claim 55, further comprising the processing device is sending a plurality of write requests targeting the region of the memory prior to sending the semaphore write request in response to receiving the host write request;
   wherein said copying comprises the processing device copying to the partner memory data written to the region of the memory by the plurality of write requests.

58. The method of claim 47, wherein said accessing the semaphore region of the memory in response to the semaphore write request updates coherence information associated with a block of data written to the region of the memory by the one or more write requests.

59. The method of claim 58, wherein the coherence information associated with the block of data includes a cache block ID identifying the address of the block of data within the region of the memory.

60. The method of claim 58, wherein the coherence information associated with the block of data includes a LBA (Logical Block Address) identifying the block of data.

61. The method of claim 58, further comprising the processing device sending write data with the semaphore write request, wherein the write data indicates that a coherence state of the block of data within the memory is mirrored, and wherein data currently stored in the semaphore region indicates that the coherence state of the block of data within the memory is invalid.

62. The method of claim 47, further comprising the processing device sending to the memory controller a metadata write request and metadata indicating a new coherence state for a block of data written to the region of the memory by the one or more write requests in response to said accessing the semaphore region of the memory in response to the semaphore write request.

63. The method of claim 62, further comprising the memory controller writing the metadata to a metadata region of the memory and broadcasting the metadata write request and the metadata to the one or more other memory controllers in response to receiving the metadata write request.

64. The method of claim 63, further comprising the processing device sending another semaphore write request to the memory controller in order to reset a value of the semaphore region of the memory subsequent to said sending the metadata write request.

65. The method of claim 64, further comprising the processing device acknowledging the host write request in response to the memory controller completing the other semaphore write request.

66. The method of claim 47, wherein said accessing the region of the memory updates a block of data, and wherein said accessing the semaphore region of the memory updates a byte of data.

67. The method of claim 47, further comprising the memory controller sending write requests to the partner memory controller in a same order in which the memory controller receives the write requests from the processing device.

68. The method of claim 47, further comprising the processing device sending a plurality of write requests to the memory controller prior to sending the semaphore write request to the memory controller;
   the processing device verifying performance of the plurality of write requests by the partner memory controller in response to said accessing the semaphore region of the memory; and
   the processing device dynamically varying a number of write requests sent between successive write requests targeting the semaphore region of the memory.

* * * * *